United States Patent
Kitamura et al.

(10) Patent No.: US 7,403,327 B2
(45) Date of Patent: Jul. 22, 2008

(54) WAVELENGTH CONVERSION ELEMENT HAVING MULTI-GRATINGS AND LIGHT GENERATING APPARATUS USING SAID ELEMENT, AND WAVELENGTH CONVERSION ELEMENT HAVING CYLINDRICAL FERROELECTRIC SINGLE CRYSTALS AND LIGHT GENERATING APPARATUS USING SAID ELEMENT

(75) Inventors: Kenji Kitamura, Tsukuba (JP); Sunao Kurimura, Tsukuba (JP); Masaru Nakamura, Tsukuba (JP); Shunji Takekawa, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 214 days.

(21) Appl. No.: 10/575,535

(22) PCT Filed: Nov. 19, 2004

(86) PCT No.: PCT/JP2004/017653

§ 371 (c)(1),
(2), (4) Date: Apr. 11, 2006

(87) PCT Pub. No.: WO2005/050307

PCT Pub. Date: Jun. 2, 2005

(65) Prior Publication Data
US 2007/0127107 A1  Jun. 7, 2007

(30) Foreign Application Priority Data
Nov. 20, 2003 (JP) .............................. 2003-391241
Nov. 20, 2003 (JP) .............................. 2003-391242

(51) Int. Cl.
G02F 1/35 (2006.01)

(52) U.S. Cl. ...................... 359/328; 359/326; 359/330; 372/22

(58) Field of Classification Search .......... 359/326–332; 372/21–22; 385/122
See application file for complete search history.

(56) References Cited

U.S. PATENT DOCUMENTS 5,253,102 A * 10/1993 Okazaki .................... 359/328
5,898,718 A *  4/1999 Mohatt et al. ................ 372/22

FOREIGN PATENT DOCUMENTS

JP   H07-234428   9/1995

(Continued)

*Primary Examiner*—Hemang Sanghavi
(74) *Attorney, Agent, or Firm*—Manabu Kanesaka

(57) ABSTRACT

A wavelength conversion element having multi-gratings free from damage propagation and a light generating apparatus using it, and a wavelength conversion element having multi-gratings to make a thermal distribution centrosymmetric, and being free from damage propagation, are provided. The wavelength conversion element is realized by comprising a holder and plural prismatic ferroelectric single crystals disposed in the holder, wherein plural prismatic ferroelectric single crystals have at least five planes; the aspect ratios of planes perpendicular to respective longitudinal directions of the plural prismatic ferroelectric single crystals are virtually unity; and each of the plural prismatic ferroelectric single crystals has a domain inversion structure with a predetermined period in the direction perpendicular to the polarization direction thereof, and is arranged in a way that said direction perpendicular to the polarization direction is the same as those of the other crystals.

58 Claims, 17 Drawing Sheets

FOREIGN PATENT DOCUMENTS

| | | |
|---|---|---|
| JP | H08-76160 | 3/1996 |
| JP | H09-304800 | 11/1997 |
| JP | 2000-338531 | 12/2000 |
| JP | 2002-90785 | 3/2002 |
| JP | 2002-156669 | 5/2002 |
| JP | 2003-307759 | 10/2003 |

* cited by examiner

WAVELENGTH CONVERSION ELEMENT HAVING MULTI-GRATINGS AND LIGHT GENERATING APPARATUS USING SAID ELEMENT, AND WAVELENGTH CONVERSION ELEMENT HAVING CYLINDRICAL FERROELECTRIC SINGLE CRYSTALS AND LIGHT GENERATING APPARATUS USING SAID ELEMENT

FIELD OF THE INVENTION

The present invention relates to a wavelength conversion element having multi-gratings, a light generating apparatus using said element, and a wavelength conversion element with centrosymmetric heat distribution. More particularly, the invention relates to a wavelength conversion element having multi-gratings free from damage propagation, capable of responding to the polarization direction and/or having centrosymmetric heat distribution, and to a light generation apparatus using said element.

BACKGROUND OF THE INVENTION

In recent years, wavelength conversion elements using ferroelectric single crystals having an excellent nonlinear optical constant and an electro-optic constant are being intensively studied. Among them, development of wavelength conversion elements adopting a quasi-phase-matched system is remarkable, due to improvements of the manufacturing technique of ferroelectric single crystals with high quality and the domain inversion structure formation technique.

Wavelength conversion elements tunable in a wide range of wavelength (hereinafter denoted merely by tunability) utilizing lithium niobate single crystals have been developed (see for example, non-patent literature 1).

FIG. 16 is a schematic diagram showing a multi-grating type quasi-phase-matched (QPM) parametric oscillator (OPO) by the prior art.

QPM OPO 1600 comprises a wavelength conversion element 1601, a first mirror 1602, a second mirror 1603, and a moving means 1604.

The wavelength conversion element 1601 is made of a congruent lithium niobate (CLN) wafer. The wavelength conversion element 1601 is 0.5 mm in thickness in the direction parallel to the polarization direction of the CLN wafer, and length of the element L is 26 mm.

The wavelength conversion element 1601 has plural domain inversion structures (gratings) with different periods. The width of each grating, $W_G$, is 500 μm. The width of the space between each of gratings is 50 μm. The period of each grating is from 26 μm to 36 μm. The gratings are arranged so that the periods of gratings increase with an increment of 0.25 μm.

These gratings are produced by the lithography technique and electric field poling process repeatedly by using a mask having a predetermined period for each grating. In the figure, only a part of multi-gratings is illustrated.

Each of the first mirror 1602 and the second mirror 1603 has a curvature radius of 150 mm. The first mirror 1602 and the second mirror 1603 are placed through the wavelength conversion element 1601, and the distance between the mirrors is 30 mm.

The moving means 1604 moves the wavelength conversion element 1601 in the parallel direction.

Next, the operation of this QPM OPO 1600 is explained.

The pump laser light (the first wavelength $\lambda_1 = 1.064$ μm) generated from a Q-switch Nd:YAG laser (not shown) is incident, through the first mirror 1602 with predetermined beam diameter, on the grating with the predetermined period in the wavelength conversion element 1601.

At that time, the moving means 1604 displaces beforehand the wavelength conversion element 1601 so that the pump laser light is incident on the predetermined grating.

Then, the pump laser light having the first wavelength $\lambda_1$ is converted into signal light having the second wavelength $\lambda_2$ and idler light having the third wavelength $\lambda_3$, dependent on the period of the wavelength conversion element 1601.

At this time, the signal light centering on the wavelength of 1.54 μm is reflected in part by the first mirror 1602 and the second mirror 1603. The signal light and the idler light transmitted through the second mirror 1603 without being reflected thereby, exit the QPM OPO 1600.

Using the QPM OPO 1600 designed in this way, when the first wavelength $\lambda_1$ of the pump laser light is 1.064 μm and the periods of the multi-gratings are from 26 μm to 32 μm, it can be achieved only by displacing the wavelength conversion element 1601 using the moving means 1604, that the second wavelength $\lambda_2$ of the signal light has a wavelength of variable range from 1.36 μm to 1.98 μm and the third wavelength $\lambda_3$ of the idler light has a wavelength of variable range from 4.83 μm to 2.30 μm.

Also, a wavelength conversion element using a lithium tantalate single crystal with a stoichiometric composition has been developed (for example, see patent literature 1).

FIG. 17 is a diagram showing a wavelength conversion system according to a prior art.

The wavelength conversion system 1700 comprises a variable wavelength laser 1701, a lens 1702 and a wavelength conversion element 1703.

The wavelength conversion element 1703 consists of a lithium tantalate single crystal with nearly stoichiometric composition having 0.3 mm to 5 mm in thickness. The wavelength conversion element 1700 has periodically poled structures with the period from 3 μm to 5 μm produced by the electric field poling process.

In this wavelength conversion system 1700, the light emitted from the variable wavelength laser 1701 (the fundamental wave) is incident on the wavelength conversion element 1703 through the lens 1702. The fundamental wave incident on the wavelength conversion element 1703 phase-matches (quasi-phase-matches) with the second harmonic of the fundamental wave by periodically poled structures in the wave-traveling direction of the light. Thus, the fundamental wave is converted into the second harmonic during propagating through the wavelength conversion element 1703.

Non-patent literature 1; L. E. Meyrs, et al., Multigrating quasi-phase-matched optical parametric oscillator in periodically poled LiNbO$_3$, OPTICS LETTERS, Apr. 15, 1996, Vol. 21, No. 8, pp. 591-593.

Patent literature 1; Japanese Patent Laid-Open No. 2002-90785.

SUMMARY OF THE INVENTION

Problems to be Solved by the Invention

However, since the wavelength conversion element 1601 shown in FIG. 16 is made of a single wafer, there is a difficulty of vulnerability to damages (damage propagation) that damage such as a crack caused in one grating by the irradiation of the pump laser light may easily propagate to other gratings. Also, the wavelength conversion element 1601 has a problem to cost a lot because the whole element must be exchanged when one grating is damaged.

As for the wavelength conversion element 1601, if production of one grating failed (when polarization reversal parts are fused) in the producing process of the multi-gratings, the wafer must be discarded as a whole, resulting in poor yield.

Moreover, the wavelength conversion element 1601 can only convert wavelength of the TM polarized light. Accordingly, when the pump laser light wavelength is TE polarized light, the TE polarization must be converted to the TM polarization. Thus, a problem is caused that the whole size of the QPM OPO becomes larger because optical systems such as a polarizer are necessary depending on the polarization of the pump laser light.

Therefore, the first object of the present invention is (i) to provide a wavelength conversion element having multi-gratings free from damage propagation, and a light generating apparatus using the element, and further to improve the yield, and to provide an element having improved freedom to the polarization of the incident light.

On the other hand, when the wavelength conversion element 1703 shown in FIG. 17 is irradiated by the light emitted from the variable wavelength laser 1701, thermal distribution can be generated in the wavelength conversion element 1703. If the thermal distribution is generated, a thermal birefringence effect of the ferroelectric single crystal, the material for the wavelength conversion element, arises. If the thermal birefringence effect arises, a problem that the polarized light is disrupted (i.e., the light mode can be varied) occurs. This deterioration of the polarization characteristics may cause a decrease in the extinction ratio. In order to compensate this thermal birefringence effect, optical system such as a polarizer and a quarter-wave retardation plate and the like have been needed, and thus the apparatus has become complex as a whole and difficult to be compact.

Also, due to the thermal birefringence effect caused by the thermal distribution, a part of the phase matching condition in the wavelength conversion element 1703 may become not possible to be satisfied. As a result, the conversion efficiency can be largely lowered. Moreover, the beam shape of the light emitted from the wavelength conversion element 1703 may be distorted (cannot hold the shape of a circle) depending on the shape of thermal distribution.

Accordingly, the second object of the present invention is (ii) to provide a wavelength conversion element having centrosymmetric thermal distribution. Also, the invention provides a wavelength conversion element with centrosymmetric thermal distribution having multi-gratings free from damage propagation, and a light generating apparatus using the same. Furthermore, the invention provides the ones with improved yield and also improved freedom to the polarization of the incident light.

Means for Solving Problems

Inventors of the present invention have studied intensively and found that the above objects can be resolved by means described below. The present invention has been conducted based on these findings.

That is, the present invention comprises inventions according to the first means to achieve the above object (i) and inventions according to the second means to accomplish the object (ii). The inventions according to the first means and those according to the second means further comprise inventions concerning to the wavelength conversion elements and inventions concerning to the light generating apparatus, respectively. These inventions consist of the constitution described below.

The Invention According to the First Means

A wavelength conversion element, an invention according to the first means of the present invention, comprises a holder and plural prismatic ferroelectric single crystals disposed in said holder; said plural prismatic ferroelectric single crystals have at least five planes; aspect ratios of planes perpendicular to respective longitudinal directions of said plural prismatic ferroelectric single crystals are set to be virtually unity; each of said plural prismatic ferroelectric single crystals has a domain inversion structure with a predetermined period in a direction perpendicular to the polarization direction thereof; and said plural prismatic ferroelectric single crystals are disposed in a way that the direction perpendicular to said polarization direction of each crystal is the same as those of other crystals. Hereby, the above objects are accomplished.

Said predetermined period may be a period enabling quasi-phase-matching of the lights wherein, when each of said plural prismatic ferroelectric single crystals converts the first light having the first wavelength $\lambda_1$ into the second light having the second wavelength $\lambda_2$ and the third light having the third wavelength $\lambda_3$, said first wavelength $\lambda_1$, said second wavelength $\lambda_2$ and said third wavelength $\lambda_3$ satisfy the relation $1/\lambda_1 = 1/\lambda_2 + 1/\lambda_3$, and the relations $\lambda_1 < \lambda_2$ and $\lambda_1 < \lambda_3$.

Said predetermined period may be a period enabling quasi-phase-matching of the lights wherein, when each of said plural prismatic ferroelectric single crystals converts the first light having the first wavelength $\lambda_1$ into the second light having the second wavelength $\lambda_2$, said first wavelength $\lambda_1$ and said second wavelength $\lambda_2$ satisfy the relation $\lambda_1 = 2 \times \lambda_2$.

Said predetermined period may be a period enabling quasi-phase-matching of the lights wherein, when each of said plural prismatic ferroelectric single crystals converts the first light having the first wavelength $\lambda_1$ and the second light having the second wavelength $\lambda_2$ into the third light having the third wavelength $\lambda_3$, said first wavelength $\lambda_1$, said second wavelength $\lambda_2$ and said wavelength $\lambda_3$ satisfy the relation $1/\lambda_1 + 1/\lambda_2 = 1/\lambda_3$.

Each of said plural prismatic ferroelectric single crystals may have six planes.

Each of said plural prismatic ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said wavelength conversion element may further comprise a temperature control element installed in said holder and a heat-insulating frame surrounding said holder and said temperature control element.

Said wavelength conversion element may also comprise a control unit for controlling said temperature control element.

Said plural prismatic ferroelectric single crystals are disposed with spaces having predetermined width, and said spaces may be filled with heat-conductive material.

Further, a light generating apparatus, an invention according to the first means of the present invention, comprises: a light source for emitting the first light having the first wavelength $\lambda_1$; a wavelength conversion element for converting said first light into the second light having the second wavelength $\lambda_2$ and the third light having the third wavelength $\lambda_3$; and a control unit for controlling the position of said wavelength conversion element. Said wavelength conversion element comprises a holder and plural prismatic ferroelectric single crystals disposed in said holder; and said plural prismatic ferroelectric single crystals have at least five planes; and the aspect ratio of the plane perpendicular to the longitudinal direction of each of said plural prismatic ferroelectric single crystals is set to be virtually unity. Each of said plural prismatic ferroelectric single crystals has a domain inversion structure with a predetermined period enabling quasi-phase-matching of the lights in the direction perpendicular to the polarization direction of each of said plural prismatic ferroelectric single crystals, so that the first wavelength $\lambda_1$, the second wavelength $\lambda_2$ and the third wavelength $\lambda 3$ satisfy the relation $1/\lambda_1=1/\lambda_2+1/\lambda_3$ and the relations $\lambda_1<\lambda_2$ and $\lambda_1<\lambda_3$. Said plural prismatic ferroelectric single crystals are disposed in a way that the direction perpendicular to said polarization direction of each crystal is the same as those of other crystals. Hereby, the above object is accomplished.

Each of said plural prismatic ferroelectric single crystals may have six planes.

Each of said plural prismatic ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said wavelength conversion element may further comprise a temperature control element installed in said holder and a heat-insulating frame surrounding said holder and said temperature control element.

Said control unit may also control the temperature of said temperature control element.

Said plural prismatic ferroelectric single crystals are disposed with spaces having predetermined width, and the said predetermined width may be filled with heat-conductive material.

Further, a light generating apparatus, another embodiment of the invention according to the first means of the present invention, comprises a light source for emitting the first light having the first wavelength $\lambda_1$; a wavelength conversion element for converting the first light into the second light having the second wavelength $\lambda_2$; and a control unit for controlling the position of said wavelength conversion element. Said wavelength conversion element comprises a holder and plural prismatic ferroelectric single crystals disposed in said holder; and said plural prismatic ferroelectric single crystals have at least five planes; and the aspect ratio of the plane perpendicular to the longitudinal direction of each of said plural prismatic ferroelectric single crystals is set to be virtually unity. Each of said plural prismatic ferroelectric single crystals has a domain inversion structure with a predetermined period enabling quasi-phase-matching of the lights in the direction perpendicular to the polarization direction of each of said plural prismatic ferroelectric single crystals so that the first wavelength $\lambda_1$ and the second wavelength $\lambda_2$ satisfy the relation $\lambda_1=2\times\lambda_2$. Said plural prismatic ferroelectric single crystals are disposed in a way that the direction perpendicular to said polarization direction of each crystal is the same as those of other crystals; and the above object is accomplished by these means.

Each of said plural prismatic ferroelectric single crystals may have six planes.

Each of said plural prismatic ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said wavelength conversion element may further comprise a temperature control element installed in said holder and a heat-insulating frame surrounding said holder and said temperature control element.

Said control unit may further control the temperature of said temperature control element.

Said plural prismatic ferroelectric single crystals are disposed with spaces having predetermined width, and said spaces may be filled with heat-conductive material.

Further, a light generating apparatus, an invention according to the first means of the present invention, comprises a first light source for emitting the first light having the first wavelength $\lambda_1$; an optical system for connecting said first light and the second light having the second wavelength $\lambda_2$ incident from outside; a wavelength conversion element for converting said first light and the second light into the third light having the third wavelength $\lambda_3$; and a control unit for controlling the position of said wavelength conversion element. Said wavelength conversion element comprises a holder and plural prismatic ferroelectric single crystals disposed in said holder; said plural prismatic ferroelectric single crystals have at least five planes; and the aspect ratio of the plane perpendicular to the longitudinal direction of each of said plural prismatic ferroelectric single crystals is set to be virtually unity. Each of said plural prismatic ferroelectric single crystals has a domain inversion structure with a predetermined period enabling quasi-phase-matching of the lights in the direction perpendicular to the polarization direction of each of said prismatic ferroelectric single crystal so that the first wavelength $\lambda_1$, the second wavelength $\lambda_2$ and the third wavelength $\lambda_3$ satisfy the relation $1/\lambda_1\pm1/\lambda_2=1/\lambda_3$; and said plural prismatic ferroelectric single crystals are disposed in a way that the direction perpendicular to said polarization direction of each crystal is the same as those of other crystals; and the above object is accomplished by these means.

Each of said plural prismatic ferroelectric single crystals may have six planes.

Each of said plural prismatic ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said wavelength conversion element may further comprise a temperature control element disposed in said holder and a heat-insulating frame surrounding said holder and said temperature control element.

Said control unit may also control the temperature of said temperature control element.

Said plural prismatic ferroelectric single crystals are disposed with spaces having predetermined width, and said spaces may be filled with heat-conductive material.

The Invention According to the Second Means

A wavelength conversion element, an invention according to the second means of the present invention, consists of a cylindrical ferroelectric single crystal with a virtually completely round cross-section, and said cylindrical ferroelectric single crystal has a domain inversion structure with a predetermined period in the direction perpendicular to said polarization direction, and thus the above object is accomplished by these means.

Said plural cylindrical ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said predetermined period may be a period enabling quasi-phase-matching of the lights wherein, when said cylindrical ferroelectric single crystal converts the first light having the first wavelength $\lambda_1$ into the second light having the second wavelength $\lambda_2$ and the third light having the third wavelength $\lambda_3$, said first wavelength $\lambda_1$; said second wavelength $\lambda_2$ and said third wavelength $\lambda_3$ satisfy the relation $1/\lambda_1 = 1/\lambda_2 + 1/\lambda_3$, and the relations $\lambda_1 < \lambda_2$ and $\lambda_1 < \lambda_3$.

Said predetermined period may be a period enabling quasi-phase-matching of the lights wherein, when said cylindrical ferroelectric single crystal converts the first light having the first wavelength $\lambda_1$ into the second light having the second wavelength $\lambda_2$, said first wavelength $\lambda_1$ and said second wavelength $\lambda_2$ satisfy the relation $\lambda_1 = 2 \times \lambda_2$.

Said predetermined period may be a period enabling quasi-phase-matching of the lights wherein, when said cylindrical ferroelectric single crystal converts the first light having the first wavelength $\lambda_1$ and the second light having the second wavelength $\lambda_2$ into the third light having the third wavelength $\lambda_3$, said first wavelength $\lambda_1$, said second wavelength $\lambda_2$ and said wavelength $\lambda_3$ satisfy the relation $1/\lambda_1 \pm 1/\lambda_2 = 1/\lambda_3$.

Also, a wavelength conversion element, an invention according to the second means of the present invention, comprises a holder and plural cylindrical ferroelectric single crystals disposed in said holder; and the cross-section of each of said plural cylindrical ferroelectric single crystals has a virtually completely round shape. Each of said plural cylindrical ferroelectric single crystals has a domain inversion structure with a predetermined period in the direction perpendicular to said polarization direction; and said plural cylindrical ferroelectric single crystals are disposed in a way that the direction perpendicular to said polarization direction of each crystal is the same as those of the other crystals; and the above object is accomplished by these means.

Each of said plural cylindrical ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said predetermined period may be a period enabling quasi-phase-matching of the lights, wherein, when each of said plural cylindrical ferroelectric single crystals convert the first light having the first wavelength $\lambda_1$ into the second light having the second wavelength $\lambda_2$ and the third light having the third wavelength $\lambda_3$, said first wavelength $\lambda_1$, said second wavelength $\lambda_2$ and said third wavelength $\lambda_3$ satisfy the relation $1/\lambda_1 = 1/\lambda_2 + 1/\lambda_3$, and the relations $\lambda_1 < \lambda_2$ and $\lambda_1 < \lambda_3$.

Said predetermined period may be a period enabling quasi-phase-matching of the lights wherein, when each of said plural cylindrical ferroelectric single crystal convert the first light having the first wavelength $\lambda_1$ into the second light having the second wavelength $\lambda_2$, said first wavelength $\lambda_1$ and said second wavelength $\lambda_2$ satisfy the relation $\lambda_1 = 2 \times \lambda_2$.

Said predetermined period may be a period enabling quasi-phase-matching of the lights wherein, when each of said plural cylindrical ferroelectric single crystal convert the first light having the first wavelength $\lambda_1$ and the second light having the second wavelength $\lambda_2$ into the third light having the third wavelength $\lambda_3$, said first wavelength $\lambda_1$, said second wavelength $\lambda_2$ and said wavelength $\lambda_3$ satisfy the relation $1/\lambda_1 \pm 1/\lambda_2 = 1/\lambda_3$.

Said holder may be made of heat-conductive material.

Said wavelength conversion element may further comprise a temperature control element disposed in said holder and a heat-insulating frame surrounding said holder and said temperature control element.

Said wavelength conversion element may also comprise a control unit for controlling said temperature control element.

Said plural cylindrical ferroelectric single crystals are disposed with spaces having predetermined width, and said spaces may be filled with heat-conductive material.

Further, a light generating apparatus, an invention according to the second means of the present invention, comprises: a light source for emitting the first light having the first wavelength $\lambda_1$; a wavelength conversion element for converting said first light into the second light having the wavelength $\lambda_2$ and the third light having the third wavelength $\lambda_3$; and a control unit for controlling the position of said wavelength conversion element. Said wavelength conversion element includes a holder and plural cylindrical ferroelectric single crystals disposed in said holder, and the cross-section of each of said plural cylindrical ferroelectric single crystals are virtually completely round. Each of said plural cylindrical ferroelectric single crystals has a domain inversion structure with a predetermined period enabling quasi-phase-matching in the direction perpendicular to the polarization direction of each of said plural cylindrical ferroelectric single crystals, so that the first wavelength $\lambda_1$, the second wavelength $\lambda_2$ and the third wavelength $\lambda_3$ satisfy the relation $1/\lambda_1 = 1/\lambda_2 + 1/\lambda_3$ and the relations $\lambda_1 < \lambda_2$ and $\lambda_1 < \lambda_3$; and said plural cylindrical ferroelectric single crystals are disposed in a way that the direction perpendicular to said polarization direction of each crystal is the same as those of the other crystals; and thus the above object is accomplished by these means.

Each of said plural cylindrical ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said wavelength conversion element may further comprise a temperature control element disposed in said holder and a heat-insulating frame surrounding said holder and said temperature control element.

Said control unit may further control the temperature of said temperature control element.

Said plural cylindrical ferroelectric single crystals are disposed with spaces having predetermined width, and said spaces may be filled with heat-conductive material.

Further, a light generating apparatus, an invention according to the second means of the present invention, comprises: a light source for emitting the first light having the first wavelength $\lambda_1$; a wavelength conversion element for converting said first light into the second light having the wavelength $\lambda_2$; and a control unit for controlling the position of said wavelength conversion element. Said wavelength conversion element includes a holder and plural cylindrical ferroelectric single crystals disposed in said holder; and the cross-section of each of said plural cylindrical ferroelectric single crystals are virtually completely round. Each of said plural cylindrical ferroelectric single crystals has a domain inversion structure with a predetermined enabling quasi-phase-matching in the direction perpendicular to the polarization direction of each of said plural prismatic ferroelectric single crystal, so that the first wavelength $\lambda_1$, and the second wavelength $\lambda_3$ satisfy the relation: $\lambda_1=2\times\lambda_2$; and said plural cylindrical ferroelectric single crystals are disposed in a way that the direction perpendicular to said polarization direction of each crystal is the same as those of the other crystals; and thus the above object is accomplished by these means.

Each of said plural cylindrical ferroelectric single-crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said wavelength conversion element may further comprise a temperature control element disposed in said holder and a heat-insulating frame surrounding said holder and said temperature control element.

Said control unit may further control the temperature of said temperature control element.

Said plural cylindrical ferroelectric single crystals are disposed with spaces having predetermined width, and said spaces may be filled with heat-conductive material.

Furthermore, a light generating apparatus, an invention according to the second means in the present invention, comprises: a first light source for emitting the first light having the first wavelength $\lambda_1$; an optical system for connecting said first light and the second light having the second wavelength $\lambda_2$ incident from outside; a wavelength conversion element for converting said first light and the second light into the third light having the third wavelength $\lambda_3$; and a control unit for controlling the position of said wavelength conversion element. Said wavelength conversion element comprises a holder and plural cylindrical ferroelectric single crystals disposed in said holder, and the each cross-section of said plural cylindrical ferroelectric single crystals are virtually completely round. Each of said plural cylindrical ferroelectric single crystals has a domain inversion structure with a predetermined period enabling quasi-phase-matching in the direction perpendicular to the polarization direction, so that the first wavelength $\lambda_1$, the second wavelength $\lambda_2$ and the third wavelength $\lambda_3$ satisfy the relation: $1/\lambda_1 \pm 1/\lambda_2 = 1/\lambda_3$; and said plural cylindrical ferroelectric single crystals are disposed in a way that the direction perpendicular to said polarization direction of each crystal is the same as those of the other crystals; and the above object is accomplished by these means.

Each of said plural cylindrical ferroelectric single crystals may be selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

Said holder may be made of heat-conductive material.

Said element may further comprise a temperature control element disposed in said holder and a heat-insulating frame surrounding said holder and said temperature control element.

Said control unit may further control the temperature of said temperature control element.

Said plural cylindrical ferroelectric single crystals are disposed with spaces having predetermined width, and said spaces may be filled with heat-conductive material.

Effects of the Invention

The wavelength conversion element, an invention according to the first means of the present invention, includes a holder and plural prismatic ferroelectric single crystals disposed in the holder. The plural prismatic ferroelectric single crystals have at least five planes and aspect ratios of planes perpendicular to respective longitudinal directions thereof are set to be virtually unity. Hereby, the element can respond to the polarization of the incident light, by only changing the arrangement of prismatic ferroelectric single crystals. Accordingly, optical systems such as polarizers are not necessary and the whole system can be made compact.

Each of the plural prismatic ferroelectric single crystals has a domain inversion structure with a predetermined period in a direction perpendicular to the polarization direction, and is disposed in a way that the direction perpendicular to the polarization direction is the same as those of the other crystals. Thus, manufacturing yield of the wavelength conversion elements can be improved because only the prismatic ferroelectric single crystal failed to construct the domain inversion structure has to be discarded. If a crack is generated in one prismatic ferroelectric single crystal in a wavelength conversion element, the crack is not propagated to the neighboring prismatic ferroelectric single crystals. Thus, it is enough to exchange only the broken prismatic ferroelectric single crystal, so that the cost can be decreased. Also, the desired combinations can be achieved corresponding to user's needs.

Also, a wavelength conversion element, an invention according to the second means of the present invention, consists of cylindrical ferroelectric single crystals with virtually completely round cross-sections. A cylindrical ferroelectric single crystal has a domain inversion structure with a predetermined period in a direction perpendicular to the polarization direction. Since the cross-section of the cylindrical ferroelectric single crystal is virtually completely round, the thermal distribution should necessarily be centrosymmetric, even when a thermal distribution is caused by the light irradiated on the wavelength conversion element. As a result, a high extinction ratio (i.e., high linearity of polarization) can be maintained and the shape of the output light from the wavelength conversion element can be maintained to be circular.

Moreover, since the cross-section of the cylindrical ferroelectric single crystal is virtually completely round, the element can easily respond to the polarization of the incident light by only changing the arrangement angle of the cylindrical ferroelectric single crystal. Accordingly, optical systems such as a polarizer are not necessary and the whole system can be made compact.

Further, since the cylindrical ferroelectric single crystal has no edges, there is no danger that unnecessary cracks can be generated in the crystal, originated from chipped edges.

Above operations and effects work and is expected.

EXPLANATION OF SYMBOLS

Figure 1:
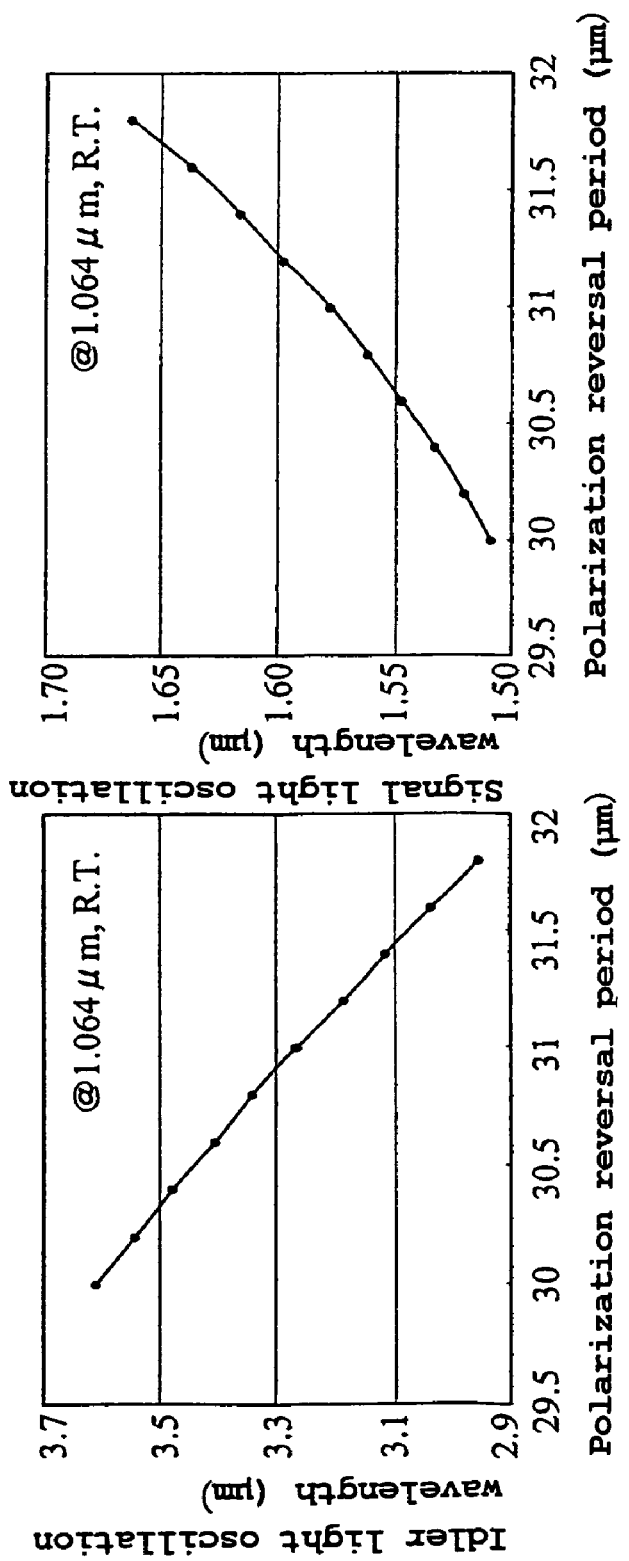
FIG. 1 shows polarization reversal period dependences of oscillation wavelengths of the idler light and the signal light for lithium tantalate with substantially stoichiometric composition doped by 1 mol % of MgO (MgSLT).

200, 300, 400, 500, 600, 610, 700, 802, 902, 1003, 1100, 1200, 1400, 1410, 1500: a wavelength conversion element
201, 1101: a periodically poled structure
202: a virtually complete round
301, 501, 1501: a holder
302, 401: plural prismatic ferroelectric single crystals
502: plural cylindrical ferroelectric single crystals
601, 1201: a temperature control element
602, 1202: a frame
801, 901, 1001: a light source
803, 903, 1004: a control unit
1002: an optical connecting system

THE BEST EMBODIMENTS FOR CARRYING OUT THE INVENTION

Hereinafter, embodiments for carrying out the invention according to each means of the present invention are described in detail referring to drawings. In the embodiments, a single crystal of lithium tantalate doped with Mg (MgSLT) with substantially stoichiometric composition, was adopted as the ferroelectric single crystal.

In this description, the term "a substantially stoichiometric composition" indicates that the mole fraction of $Li_2O/(Nb_2O_5+Li_2O)$ is not completely equal to 0.5, but it has a composition closer to the stoichiometric ratio (i.e. the mole fraction of $Li_2O/(Nb_2O_5+Li_2O)=0.490$ to 0.5) than to the congruent composition, and the degree of deterioration in characteristics of a device due to the above (inequality to 0.5) does not matter in the usual design of the device.

Such MgSLT may be produced, for example by Czochralski method using double crucibles described in Japanese Patent Laid-Open No.2000-344595.

It is worth noticing that MgSLT is only an example of ferroelectric single crystals, and that any arbitrary ferroelectric single crystals such as lithium niobate with a substantially stoichiometric composition (SLN), lithium tantalate with a substantially stoichiometric composition (SLT), and SLN or SLT doped with impurities (for example, Mg, Zn, Sc, and In and the like) and the like may be used.

In the figure, the same elements are given the same number, and explanations thereof are omitted.

Embodiment 1 of the Invention According to the First Means

FIG. 1 shows polarization reversal period dependences of oscillation wavelengths of the idler light and the signal light for lithium tantalate with substantially stoichiometric composition doped with 1 mol % of MgO (MgSLT).

In the figures, the abscissas indicate the polarization reversal period, and the ordinates indicate the wavelengths of the idler light and the signal light, respectively. FIG. 1 shows polarization reversal period dependences of wavelengths of the idler light and the signal light generated when the pump light with the wavelength of 1.064 µm is incident on MgSLT having various periods and are parametrically oscillated.

In FIG. 1, it is seen that when the MgSLT is used in the parametric oscillator for the polarization reversal period ranging from 29.5 µm to 32 µm, the oscillation wavelength of the idler light has tunability from 2.9 µm to 3.7 µm. Similarly, it is seen that the wavelength of the signal light has tunability from 1.5 µm to 1.7 µm.

Not shown by the figure, but it has been found that in the range of polarization reversal period from 26 µm to 33 µm, the oscillation wavelength of the idler light has tunability from 2.5 µm to 4.0 µm, and the oscillation wavelength of the signal light has tunability from 1.45 µm to 1.85 µm for above described MgSLT.

Figure 2:
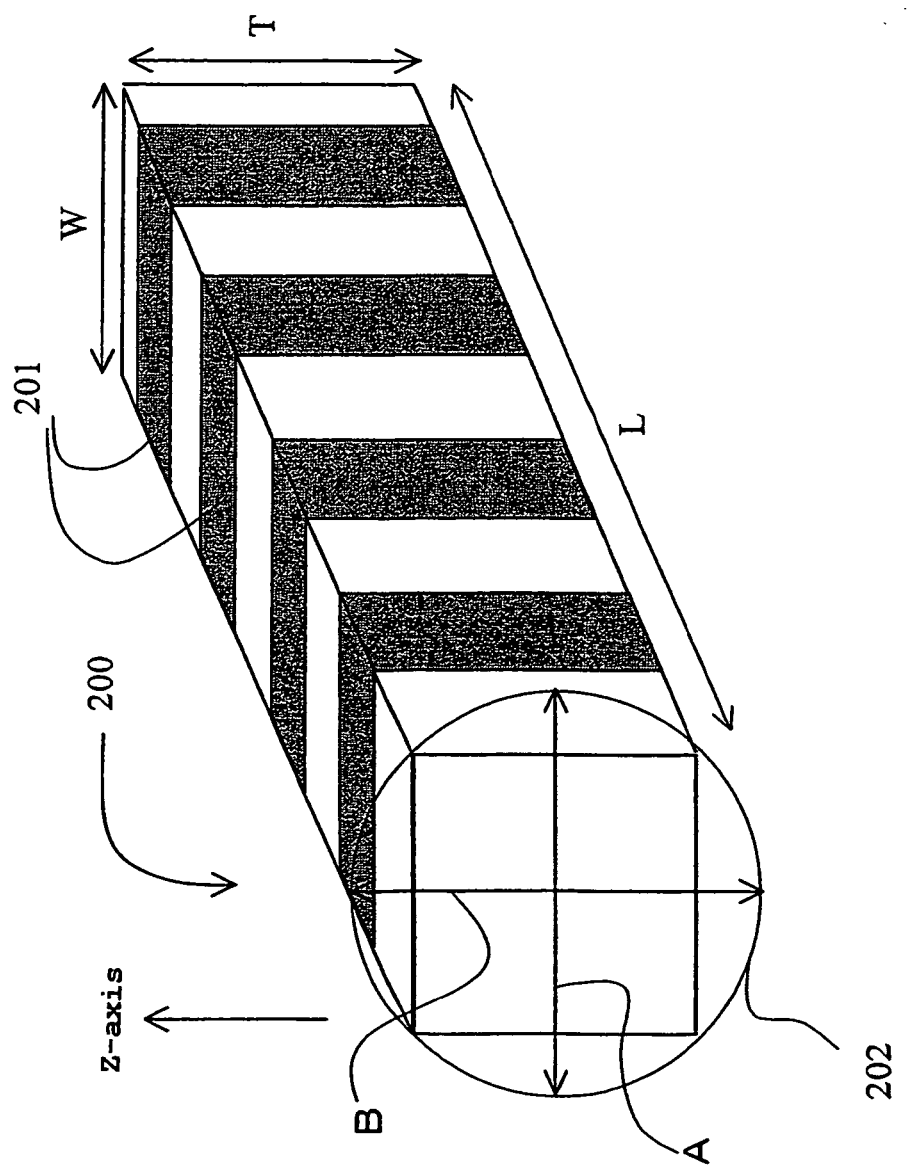
FIG. 2 is a perspective view showing a prismatic ferroelectric single crystal according to the first means of the present invention.

FIG. 2 is a perspective view of a prismatic ferroelectric single crystal according to Embodiment 1 of the invention according to the first means of the present invention. The prismatic ferroelectric single crystal 200 is, for example, the MgSLT in FIG. 1. The prismatic ferroelectric single crystal 200 has at least five planes. The figure shows the prismatic ferroelectric single crystal having six planes. The prismatic ferroelectric single crystal 200 has periodically poled structures 201 with a predetermined period in a direction perpendicular to the polarization direction. That is, one prismatic ferroelectric single crystal 200 has a single grating.

Now, the above-predetermined period is explained. In the case when the parametric oscillation is generated using the prismatic ferroelectric single crystal 200, let the wavelength of the light incident on the prismatic ferroelectric single crystal 200 be denoted by $\lambda_1$, and the wavelengths of the light emitted from the prismatic ferroelectric single crystal 200 be denoted by $\lambda_2$ and $\lambda_3$, respectively, then the range of the polarization reversal period possible to quasi-phase match the lights is determined so that the relation: $1/\lambda_1=1/\lambda_2+1/\lambda_3$ and the relations: $\lambda_1<\lambda_2$ and $\lambda_1<\lambda_3$ are satisfied.

Similarly, in the case when the second harmonic is generated using the prismatic ferroelectric single crystal 200, let the wavelength of the light incident on the prismatic ferroelectric single crystal 200 be denoted by $\lambda_1$, and the wavelength of the light emitted from the prismatic ferroelectric single crystal 200 by $\lambda_2$, then the range of the polarization reversal period possible to quasi-phase match the light is determined so that the relation: $\lambda_1=2\times\lambda_2$ is satisfied.

Similarly, in the case when the difference frequency or sum frequency is generated using the prismatic ferroelectric single crystal 200, let the wavelengths of the light incident on the prismatic ferroelectric single crystal 200 be denoted by $\lambda_1$ and $\lambda_2$, respectively, and the wavelengths of the light emitted from the prismatic ferroelectric single crystal 200 by $\lambda_3$, then the polarization reversal period possible to quasi-phase match the light is determined so that the relation: $1/\lambda_1\pm1/\lambda_2=1/\lambda_3$ is satisfied.

When the prismatic ferroelectric single crystal 200 is MgSLT, the polarization reversal period for the parametric oscillation is selected within the range from 26 µm to 33 µm, and the polarization reversal period for the second harmonic is selected within the range from 1 µm to 10 µm.

In the case of difference frequency generation, an arbitrary polarization reversal period is selected dependent on the wavelength, $\lambda_2$. It should be noted that these polarization reversal periods are peculiar to the ferroelectric single crystal.

The length L of the prismatic ferroelectric single crystal 200 in the direction perpendicular to the polarization direction is, for example, 35 mm. The thickness (length) T of the prismatic ferroelectric single crystal 200 in Z-axis direction is, for example, 2 mm. The width W of the prismatic ferroelectric single crystal 200 is, for example, 2 mm. It should be noted that these length L, thickness T and width W are only examples, and are not limited to these values. The cross-section in the figure is the plane parallel to the polarization direction of the prismatic ferroelectric single crystal 200, but is not limited to this.

Such a periodically poled structure 201 can be formed by an electric field poling process, for example, but is not limited to this method. Arbitrary methods such as an electron beam scanning irradiation method or a proton exchange heat treatment method or the like may be adopted. Reflective films may be formed on the end faces of the prismatic ferroelectric single crystal 200.

A circle 202 formed by connecting each of apexes of a plane: perpendicular to the longitudinal direction of the prismatic ferroelectric single crystal 200, is virtually completely round. "Virtually completely round" indicates that the ratio of an arbitrary diameter A to another arbitrary diameter B (A/B) of the circle 202 is not always equal to unity, but the degree of deterioration of characteristics of a device, brought about when such prismatic ferroelectric single crystal 200 is used, does not matter to the usual design of the device. In this description, when the circle 202 of the prismatic ferroelectric single crystal 200 is virtually completely round, it is stated that the aspect ratio of the plane perpendicular to the longitudinal direction of prismatic ferroelectric single crystal 200 is virtually unity.

Thus, since the aspect ratio of the prismatic ferroelectric single crystal 200 is virtually unity, an arrangement of the prismatic ferroelectric single crystal 200 can be changed dependent on polarization of the incident light. That is, by changing only the arrangement of the prismatic ferroelectric single crystal 200, the wavelength of any light with an arbitrary polarization can be converted.

Figure 3:
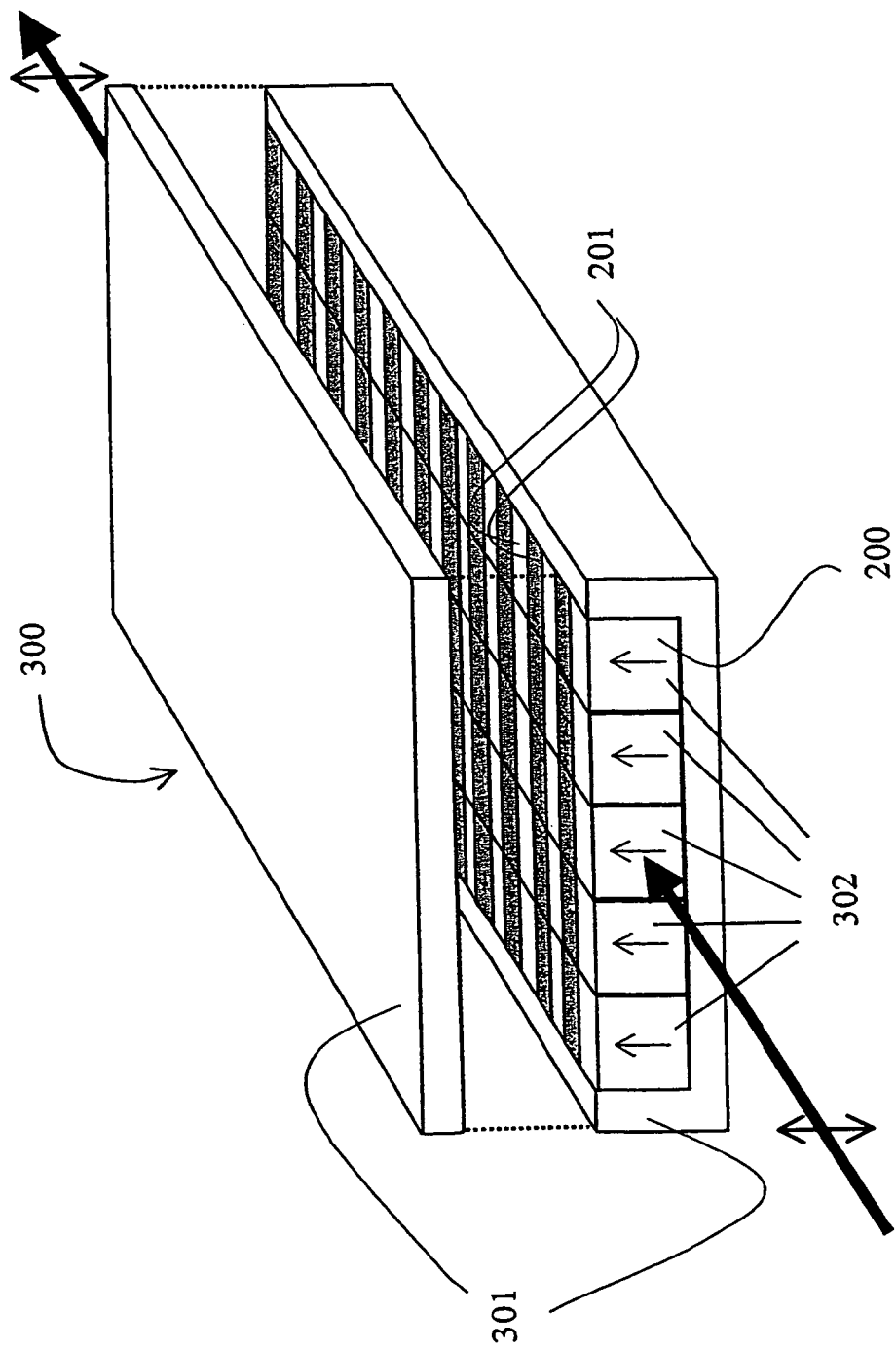
FIG. 3 is a perspective view showing a wavelength conversion element according to the first means of the present invention.

FIG. 3 is a perspective view of a wavelength conversion element according to Embodiment 1 of the invention according to the first means of the present invention. The wavelength conversion element 300 comprises a holder 301 and plural prismatic ferroelectric single crystals 302. The holder 301 houses the plural prismatic ferroelectric single crystals 302. The size (length, width, and thickness) of the holder 301 can be modified dependent on the number of the prismatic ferroelectric single crystals 200 contained and the arrangement of plural prismatic ferroelectric single crystals 302. In the figure, the holder 301 consists of a base and a cover, but the construction of the holder 301 is not limited to this construction. For example, the holder may be a rectangular tube.

The holder 301 is preferably made of heat-conductive material such as copper. Due to this, a heat distribution caused by the irradiation of incident light formed within the plural prismatic ferroelectric single crystals 302 can be reduced. When the heat distribution is generated in the plural prismatic ferroelectric single crystals 302, the refractive index of each of the plural prismatic ferroelectric single crystals 302 is changed by the heat, and occasionally, desired wavelength conversion may become impossible.

The plural prismatic ferroelectric single crystals 302 are arranged so that the direction perpendicular to the polarization direction of each crystal is the same as those of the other crystals. In this way, multi-gratings can be easily achieved. In the figure, for simplicity, five prismatic ferroelectric single crystals 302 are arranged in a plane and the polarization of each crystal is oriented to the same direction. However, the number of the prismatic ferroelectric single crystals 200 and the arranging manner thereof may be arbitrarily determined as long as the direction perpendicular to the polarization direction of each prismatic ferroelectric single crystal 200 is the same as those of the other crystals. The polarization reversal period of each of the plural prismatic ferroelectric single crystals 302 can be selected according to user's needs from within the above-mentioned predetermined range of the periods.

In these ways, the wavelength conversion element 300 according to the present invention accomplishes the multi-gratings by arbitrarily combining single prismatic ferroelectric single crystals 200 each having a single grating. Thus, when any prismatic ferroelectric single crystal out of the plural prismatic ferroelectric single crystals (multi-gratings) 302 is broken during manufacturing of the wavelength conversion element 300, only exchange of the broken prismatic ferroelectric single crystal is enough, and so the yield may be improved.

Also, even if a crack is generated in one prismatic ferroelectric single crystal at the time of using wavelength conversion element 300, a crack does not propagate into the neighboring prismatic ferroelectric single crystals. Accordingly, only the cracked prismatic ferroelectric single crystal has to be changed, and the cost of the user can be reduced.

Next, the operation of the wavelength conversion element 300 is explained.

The light from outside (light source, for example) of the wavelength conversion element 300 (the incident light) is incident on a prismatic ferroelectric single crystal having a specific polarization reversal period among the plural prismatic ferroelectric single crystals 302, in order to be converted into the light having desired wavelength. In this case, the polarization mode of the incident light is assumed to be a longitudinal mode. Depending on the polarization reversal period of the wavelength conversion element 300, the wavelength of the incident light is converted, based on the parametric oscillation, the second harmonic generation, or difference frequency generation. Then, it is emitted from the wavelength conversion element 300 as the output light.

For example, in the case of the parametric oscillation, when the wavelength of the pump light (incident light) is 1.064 μm and the specific polarization reversal period is 31.8 μm, the wavelengths of the idler light and signal light (output lights) are, respectively, 2.5 μm and 1.85 μm. In this way, the tunability can be accomplished by moving the wavelength conversion element 300 manually or using machine control so that the incident light irradiates a prismatic ferroelectric single crystal having a specific polarization reversal period.

Figure 4:
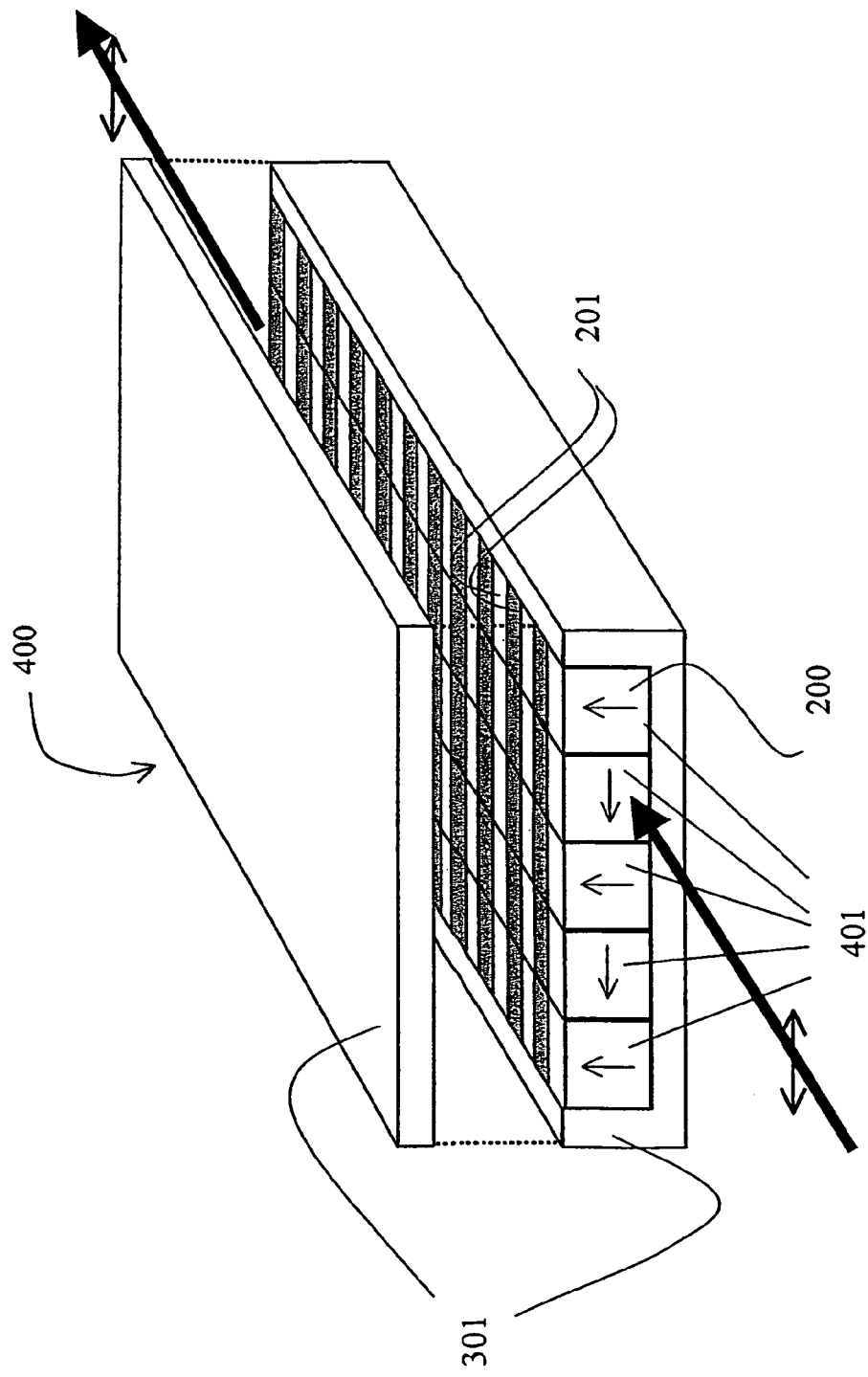
FIG. 4 is a perspective view showing another embodiment of the wavelength conversion element according to the first means of the present invention.

FIG. 4 is a perspective view of a wavelength conversion element of another embodiment according to Embodiment 1 of the invention according to the first means of the present invention.

The wavelength conversion element 400 is the same as the wavelength conversion element 300 in FIG. 3, except that the manner in arrangements of the plural prismatic ferroelectric single crystals 401 is different from that in FIG. 3. The plural prismatic ferroelectric single crystals 401 are arranged so that the respective polarization directions thereof are at an angle of 90° with each other. However, FIG. 4 is an example, and the manner in arrangements of the plural prismatic ferroelectric single crystals 401 can be set arbitrarily.

By arranging the plural prismatic ferroelectric single crystals 401 with their polarization direction being different with each other in this way, the wavelength can be converted without providing an optical system such as a polarizer or the like between the incident light source (not shown) and the wavelength conversion element 400, even when the polarization mode of the incident light is TE mode. Accordingly, the whole system can be made compact.

According to the present invention, because the aspect ratio of the prismatic ferroelectric single crystal 200 is virtually unity, the polarization direction of the wavelength conversion element 300 and 400 against that of the incident light can be set to an arbitrary direction. As a result, since the degree of freedom of the element to polarization of the light source becomes higher, an arbitrary light source can be used.

Figure 5:
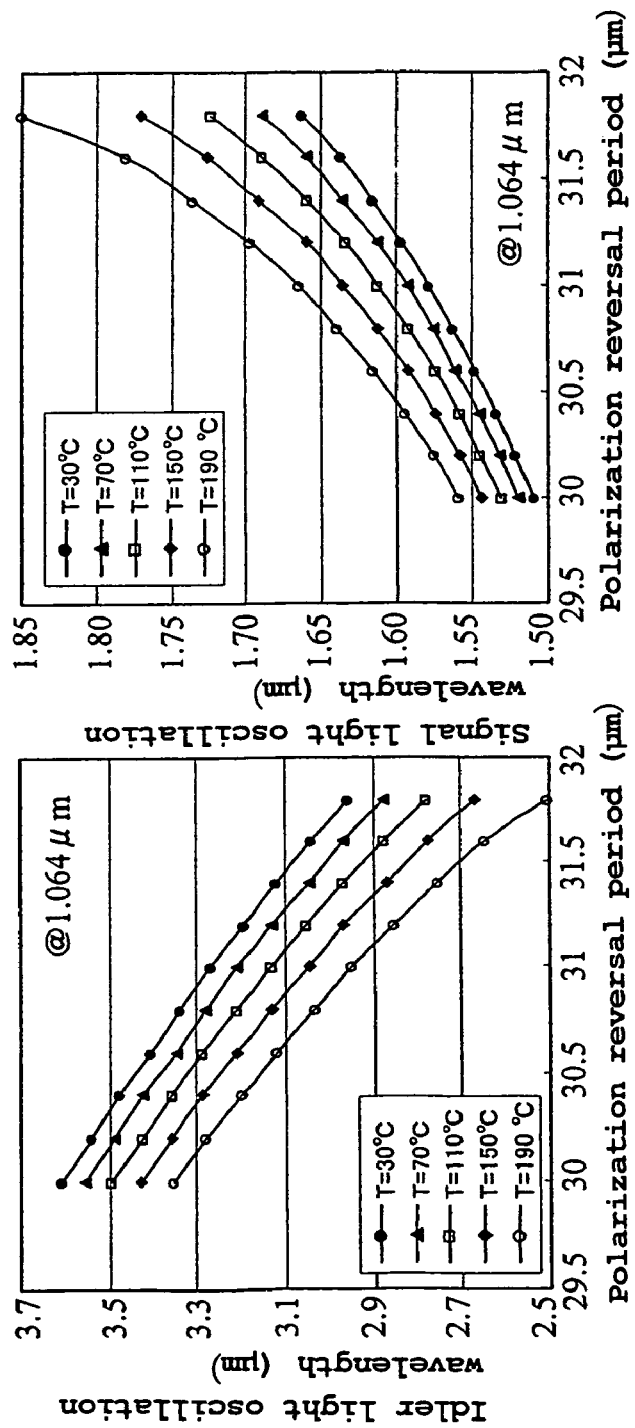
FIG. 5 shows temperature dependences of oscillation wavelengths of the idler light and the signal light for lithium tantalate with substantially stoichiometric composition doped by 1 mol % of MgO (MgSLT).

FIG. 5 shows temperature dependences of oscillation wavelengths of the idler light and the signal light from lithium tantalate with substantially stoichiometric composition doped by 1 mol % MgO (MgSLT). In the figures, the abscissas indicate the polarization reversal period and the ordinates indicate the oscillation wavelengths of the idler light and the signal light, respectively. FIG. 5 shows polarization reversal period dependences of oscillation wavelengths of the idler light and the signal light generated when the pump light with the wavelength of 1.064 μm is incident on MgSLT having various periods and the parametric oscillation is generated at various temperatures. In the figures, results for MgSLT at the room temperature (30° C.) and the results for MgSLT at 70° C., 110° C., 150° C., and 190° C. are shown.

From FIG. 5, it has been found that when the MgSLT is used in the parametric oscillator, the oscillation wavelength of the idler light, for example, has tunability by the temperature of about 0.4 μm at the same polarization reversal period. In addition to controlling the period of domain inversion structure, the control of the temperature of the prismatic ferroelectric single crystal 200 can accomplish an even more precisely controlled tunability.

Figure 6:
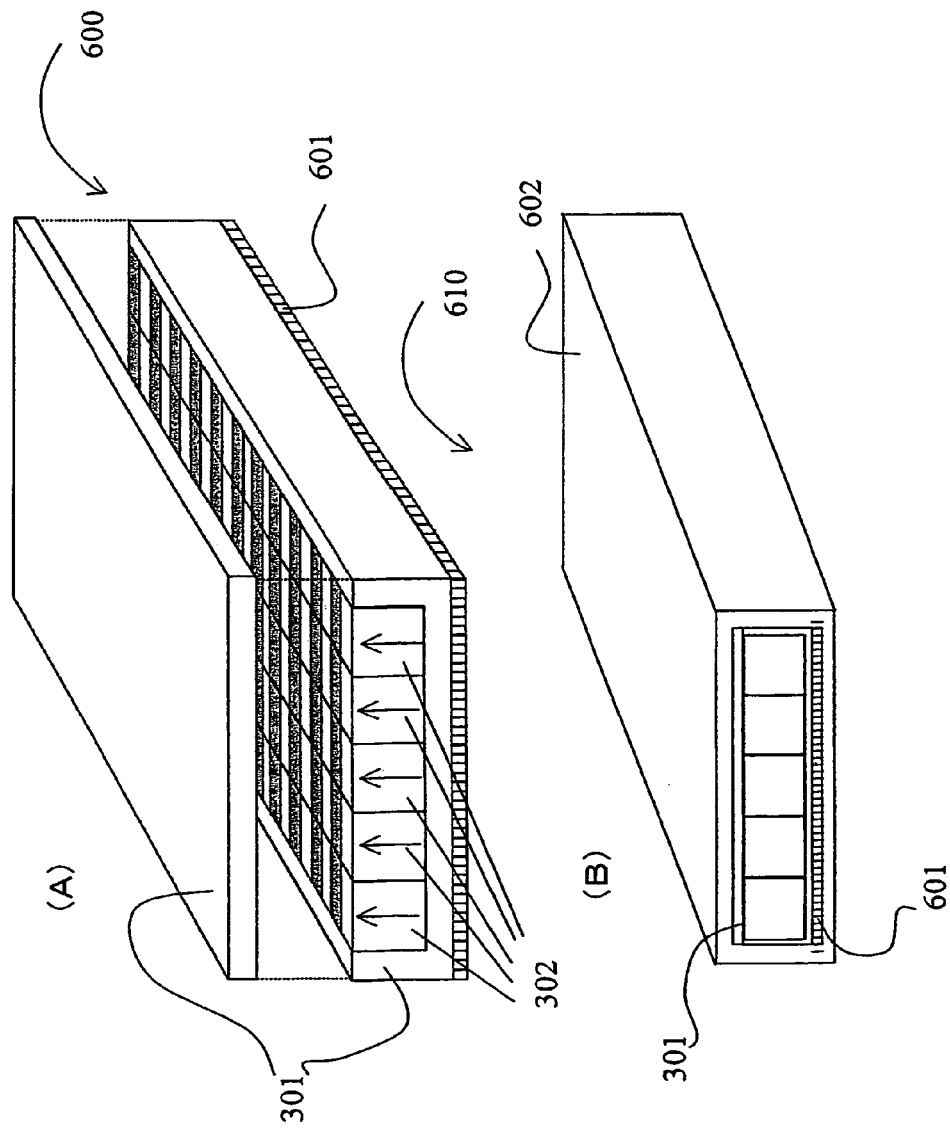
FIG. 6 is a perspective view showing another embodiment of the wavelength conversion element according to the first means of the present invention.

FIG. 6 is a perspective view of a wavelength conversion element of still another embodiment of the invention according to the first means of the present invention. In FIG. 6, the wavelength conversion element 600 shown in (A) is the same as the wavelength conversion element 300 explained with reference to FIG. 3, except for having a temperature control element 601. As explained with reference to FIG. 5, for example, since the prismatic ferroelectric single crystal of MgSLT has tunability by the temperature, an even more precisely controlled tunability can be achieved by disposing a temperature control element 601 in the wavelength conversion element 600.

In FIG. 6, the wavelength conversion element 610 illustrated in (B) is equipped with a frame 602 surrounding the temperature control element 601. The frame 602 is made of heat-insulating material. In this way, by surrounding a holder 301 and the temperature control element 601 with the heat-insulating frame 602, dissipation of heat of the temperature control element 601 can be prevented and the plural prismatic ferroelectric single crystals 302 can be heated uniformly, and user's injury by the heat of the temperature control element 601 can be avoided. The temperature control element 601 can be, for example, a Peltier element.

The wavelength conversion element 600 or 610 may be further equipped with a control unit (not shown) to control the temperature control element 601. Such a control unit has the polarization reversal period dependence of the emitted wavelengths, peculiar to the ferroelectric single crystal material shown in FIG. 1, and/or the temperature dependence of the emitted wavelengths peculiar to the ferroelectric single crystal shown in FIG. 5, and thus this control unit may utilize these dependences to control the temperature control element 601 for obtaining an appropriate temperature.

Figure 7:
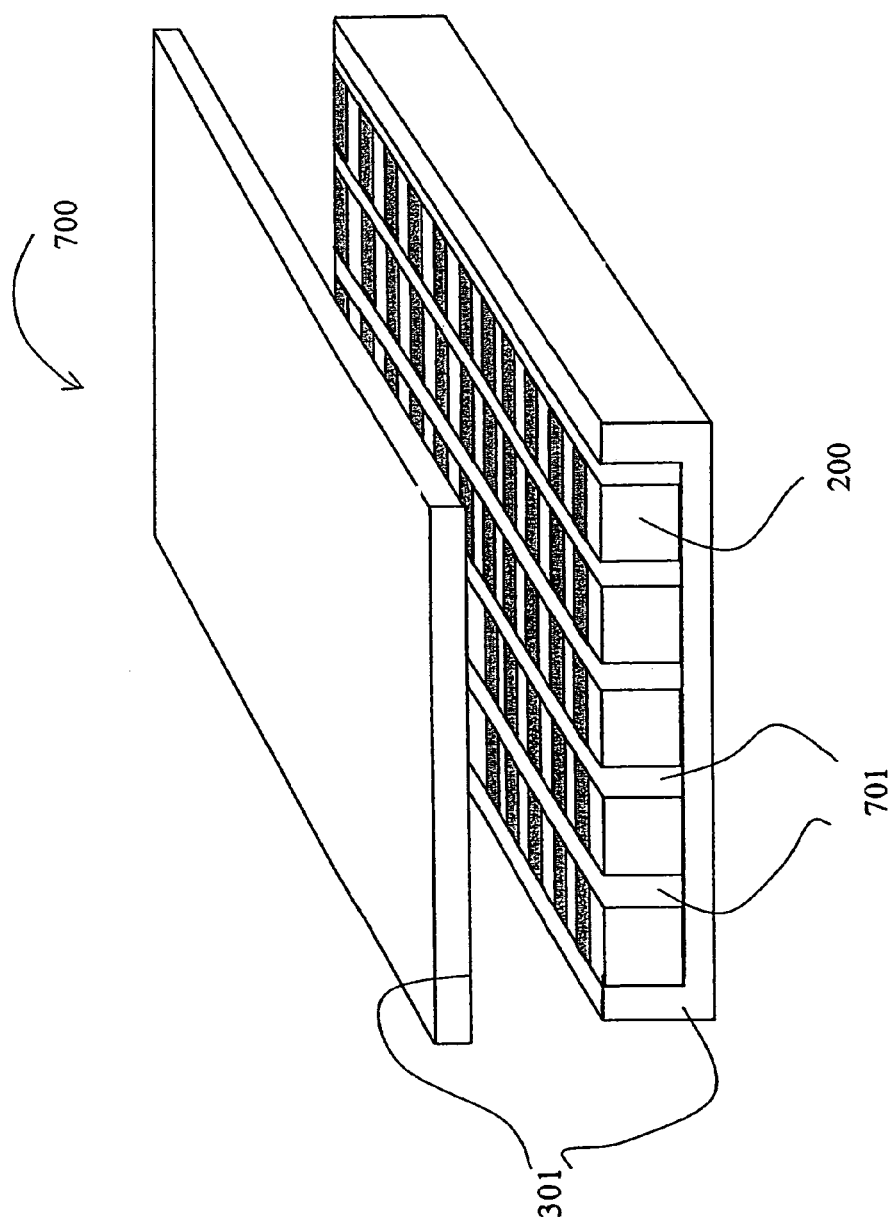
FIG. 7 is a perspective view showing another embodiment of the wavelength conversion element according to the first means of the present invention.

FIG. 7 is a perspective view of a wavelength conversion element of another embodiment according to the first means of the present invention. The wavelength conversion element 700 is the same as the wavelength conversion element 300 explained with reference to FIG. 3, except that the plural prismatic ferroelectric single crystals are arranged with spaces having a predetermined width and the spaces are filled with heat-conductive material 701.

Thus, by filling the space between each of the prismatic ferroelectric single crystals with the heat-conductive material 701, a heat possibly generated by the incident light within the prismatic ferroelectric single crystal can be dissipated and the generation of heat distribution can be reduced.

As a result of this, the birefringence effect caused by heat is reduced; the polarization mode of the light propagating in the wavelength conversion element 700 is maintained; and the conversion efficiency can be kept constant. The predetermined width of the space is, for example, 50 μm, but not limited to this space. In FIG. 7, the holder 301 and the heat-conductive material 701 are shown as different elements, but the holder 301 and the heat-conductive material 701 may be formed in one unit.

As explained above, the tunability of the converted wavelengths can be easily achieved, by combining the prismatic ferroelectric single crystals having predetermined periods to form the wavelength conversion element having multi-gratings. The prismatic ferroelectric single crystal does not depend on the polarization direction of the incident light, because the aspect ratio thereof is virtually unity. Accordingly, the degree of freedom of the light source of the incident light may be increased and the whole size of the optical system can be made compact. As the wavelength conversion element of the present invention is formed by combining the prismatic ferroelectric single crystals, only the broken prismatic ferroelectric single-crystal during manufacturing has to be discarded, and the yield thereof is improved.

Moreover, on the time of use thereof, only the broken prismatic ferroelectric single crystal has to be exchanged, so that the user's cost may be reduced. As the wavelength conversion element of the present invention is formed by arbitrarily combining the prismatic ferroelectric single crystals, the degree of freedom is high and adjustments according to user's needs may be possible.

In the above Embodiment 1, an example of the wavelength conversion element using the prismatic ferroelectric single crystal 200 of MgSLT with six planes as explained with reference to FIG. 2, has been shown. It should be noted that these are only examples. Effects of the present invention can be realized, if plural prismatic ferroelectric single crystals made of any arbitrary ferroelectric single crystal material, having at least five planes and the aspect ratio of virtually unity, are used.

Embodiment 2 of the Invention According to the First Means

Figure 8:
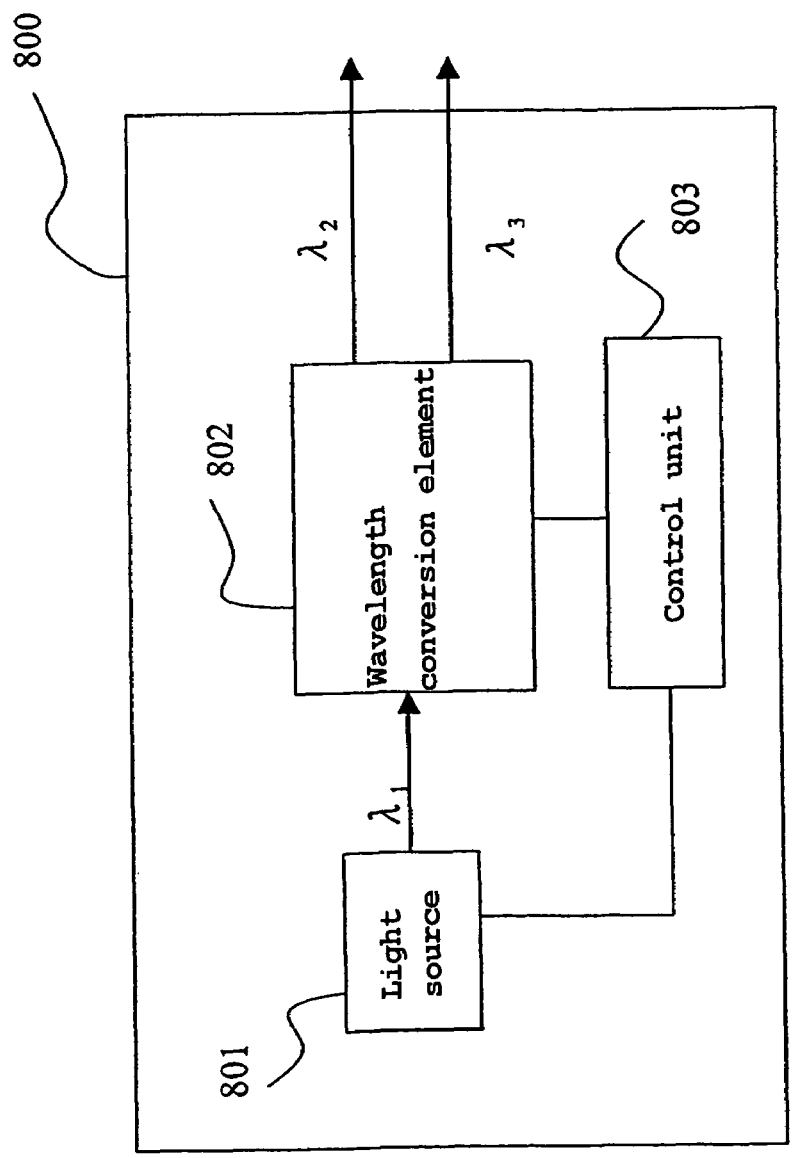
FIG. 8 is a diagram illustrating a light generating apparatus utilizing the parametric oscillation according to the first means or second means of the present invention.

FIG. 8 is a diagram illustrating a light generating apparatus utilizing the parametric oscillation according to Embodiment 2 according to the first means of the present invention.

The light generating apparatus 800 comprises a light source 801, the wavelength conversion element 802 and a control unit 803.

The light source 801 emits the first light (the pump light) having the first wavelength $\lambda_1$. In the present invention, the polarization of the first light may be either a TM mode or a TE mode. The light source 801 is a Q-switch Nd:YAG laser with the first wavelength of $\lambda_1=1.064$ μm, for example. A tunable light source may be used for the light source 801.

The wavelength conversion element 802 is any one of the wavelength conversion element 300, 400, 600, 610, and 700 explained in Embodiment 1, or a variation example thereof. The wavelength conversion element 802 converts the first light received from the light source 801 into the second light (a signal light) with the second wavelength $\lambda_2$ and the third light (an idler light) with the third wavelength $\lambda_3$.

Hereat, each of the plural prismatic ferroelectric single crystals in the wavelength conversion element 802 has a domain inversion structure with a predetermined period enabling quasi-phase-matching in the direction perpendicular to respective polarization directions, so that the first wavelength $\lambda 1$, the second wavelength $\lambda_2$ and the third wavelength $\lambda_3$ satisfy the relation: $1/\lambda_1=1/\lambda_2+1/\lambda_3$ and the relations: $\lambda_1<\lambda_2$ and $\lambda_1<\lambda_3$.

When the MgSLT shown in FIG. 1 and FIG. 5 is used for the prismatic ferroelectric single crystal, the polarization reversal periods of the prismatic ferroelectric single crystals are selected within the range from 26 μm to 33 μm. The prismatic ferroelectric single crystal is not limited to MgSLT.

The control unit 803 controls the position of the wavelength conversion element 802 so that the first light emitted from the light source 801 irradiates the predetermined prismatic ferroelectric single crystal in the wavelength conversion element 802. The control unit 803 may obtain the information the first light possesses (e.g., wavelength, polarization) from the light source 801 and may control the position of the wavelength conversion element 802, based on the obtained information. The control unit 803, for example, may store the data about the period dependence and the data about the temperature dependence of the idler light and the signal light of the prismatic ferroelectric single crystal shown in FIG. 1 and FIG. 5, and may control the position of the wavelength conversion element 802, based on these data.

The light generating apparatus 800 may be provided with reflecting mirrors (not shown) between the light source 801 and the wavelength conversion element 802, and on the light-emitting side of the wavelength conversion element 802, respectively, and may be made to function as a resonator.

Next, the operation of the light generating apparatus 800 is explained.

The light source 801 emits the first light having the first wavelength, $\lambda_1=1.064$ μm to the wavelength conversion element 802. The control unit 803 controls the position of the wavelength conversion element 802, based on the information the first light possesses (e.g., wavelength, polarization) or the like, so that the user can obtain a light with a desired wavelength. For example, when the user wants to obtain the third light (the idler light) with the third wavelength, $\lambda_3=3.62$ μm, the control unit 803 controls the position of the wavelength conversion element 802, so that the first light is incident on the prismatic ferroelectric single crystal having the polarization reversal period of 30 μm.

The first light incident on the predetermined prismatic ferroelectric single crystal in the wavelength conversion element 802 is converted, satisfying the above relation, into the second light (a signal light) with the wavelength $\lambda_2=1.507$ μm and the third light (an idler light) with the wavelength $\lambda_3=3.62$ μm.

The second light converted in this way is in the wavelength band of optical communications and can be utilized in the optical communications. The third light is in the wavelength band useful for the gas spectroscopy, and may be used chemical analyses.

The light generating apparatus 800 according to the present invention comprises a wavelength conversion element 802 having multi-gratings formed by combining the prismatic ferroelectric single crystals with the predetermined periods. Hereby, a tunability of the converted wavelengths can be easily achieved. As explained in Embodiment 1, the prismatic ferroelectric single crystal has the aspect ratio of virtually unity, and so does not depend on the polarization direction of incident light. Accordingly, the degree of freedom of the light source of the incident light is increased and the whole size of the optical system can be made compact.

As the wavelength conversion element 802 of the light generating apparatus 800 according to the present invention is formed by combining the prismatic ferroelectric single crystals, only the prismatic ferroelectric single crystal broken in the manufacturing process has to be discarded, and the yield thereof is improved. Moreover, on the time of use thereof, only the broken prismatic ferroelectric single crystal has to be exchanged, so that the cost of the users may be reduced. Because the wavelength conversion element 802 of the light generating apparatus 800 according to the present invention is formed by arbitrarily combining the prismatic ferroelectric single crystals, adjustments according to user's needs may be possible.

Embodiment 3 of the Invention According to the First Means

Figure 9:
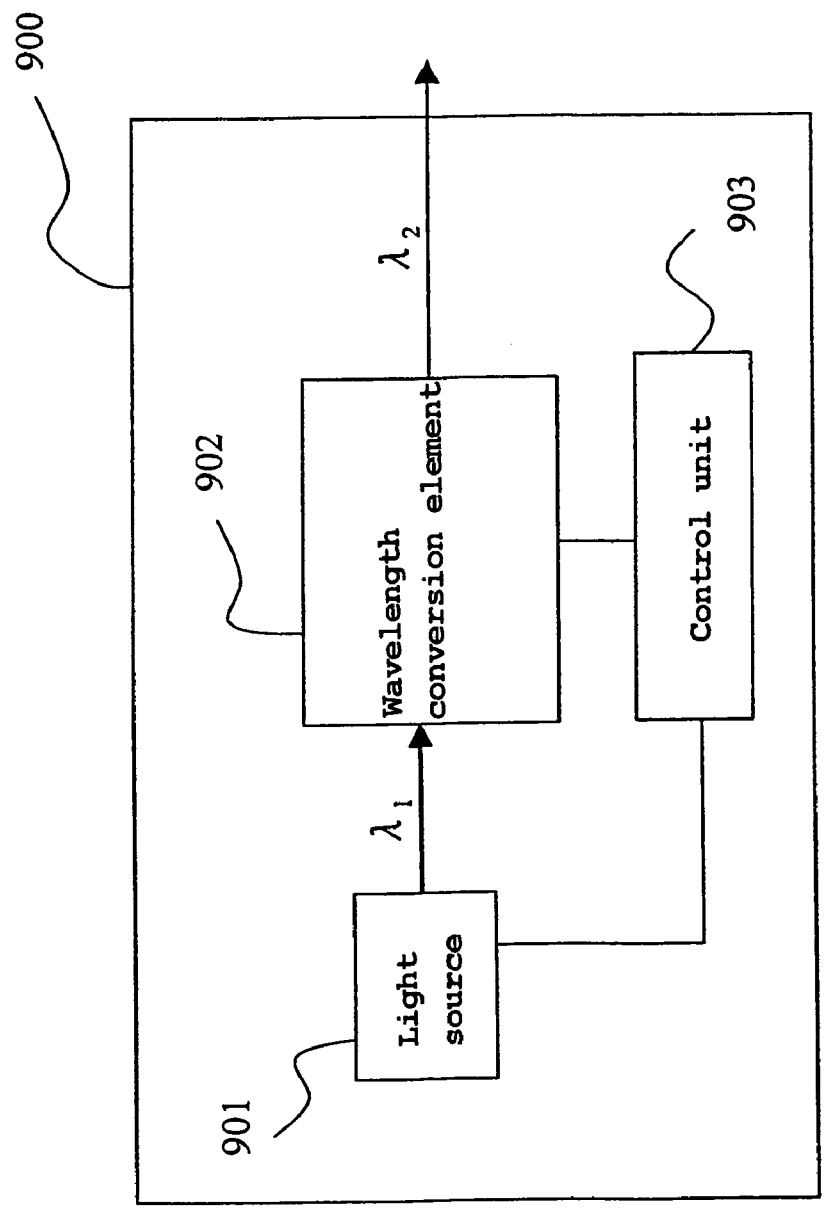
FIG. 9 is a diagram illustrating a light generating apparatus utilizing the second harmonic generation according to the first means or second means of the present invention.

FIG. 9 is a diagram illustrating a light generating apparatus utilizing the second harmonic generation according to Embodiment 3 according to the first means of the present invention.

The light generating apparatus 900 comprises a light source 901, the wavelength conversion element 902, and a control unit 903.

The light source 901 emits the first light (the fundamental wave) having the first wavelength $\lambda_1$. In the present invention, the polarization of the first light may be either a TM mode or a TE mode. The light source 901 can be a tunable semiconductor laser (a variable wavelength laser) emitting the coherent first light.

The wavelength conversion element 902 is any one of the wavelength conversion element 300, 400, 600, 610, and 700, explained in Embodiment 1, or a variation example thereof. The wavelength conversion element 902 converts the first light received from the light source 901 into the second light (the second harmonic) with the wavelength $\lambda_2$.

At that time, each of the plural prismatic ferroelectric single crystals in the wavelength conversion element 902 has a domain inversion structure with a predetermined period enabling quasi-phase-matching in the direction perpendicular to respective polarization directions, so that the first wavelength $\lambda_1$ and the second wavelength $\lambda_2$ satisfy the relation: $\lambda_1 = 2 \times \lambda_2$. When the MgSLT is used for the prismatic ferroelectric single crystal, the polarization reversal periods of the prismatic ferroelectric single crystals are selected within the range from 1 μm to 10 μm. The prismatic ferroelectric single crystal is not limited to MgSLT.

The control unit 903 controls the position of the wavelength conversion element 902 so that the first light emitted from the light source 901 irradiates the predetermined prismatic ferroelectric single crystal in the wavelength conversion element 902. The control unit 903 may obtain the information the first light possesses (e.g., wavelength, polarization) from the light source 901, and may control the position of the wavelength conversion element 902 based on the obtained information. The control unit 903, for example, may store the data about the period dependence and the data about the temperature dependence of the second harmonic in the prismatic ferroelectric single crystal, and may control the position of the wavelength conversion element 902 based on these data. The control unit 903 may control the light source 901 in order to set the first wavelength $\lambda_1$ emitted from the light source 901 so that the user can obtain a light with a desired wavelength.

The light generating apparatus 900 may be equipped with reflecting mirrors (not shown) between the light source 901 and the wavelength conversion element 902, and on the light-emitting side of the wavelength conversion element 902, respectively, and may be made to function as a resonator.

Next, the operation of the light generating apparatus 900 is explained.

For example, when the user wants to obtain the second light with the second wavelength, $\lambda_2 = 0.39$ μm, the control unit 903 controls the light source 901 to make it emit the first light having the first wavelength, $\lambda_1 = 0.78$ μm. Then, the control unit 903 controls the position of the wavelength conversion element 902 based on the information the first light possesses (wavelength, polarization) and the like. In this case, the control unit 903 controls the position of the wavelength conversion element 902 so that the first light is incident on the prismatic ferroelectric single crystal having the polarization reversal period of 3 μm. The first light incident on the predetermined prismatic ferroelectric single crystal in the wavelength conversion element 902 is, satisfying the above relation, converted into the second light (the second harmonic) with the second wavelength, $\lambda_2 = 0.39$ μm.

The light generating apparatus 900 according to the above-mentioned Embodiment 3 comprises the wavelength conversion element 902 having multi-gratings formed by combining the prismatic ferroelectric single crystals with the predetermined periods. Hereby, the element can always generate the phase-matched second harmonic especially for the tunable light source 901 emitting the fundamental wave (i.e., tunability of the light source 901 can be easily achieved).

As explained in Embodiment 1, since the prismatic ferroelectric single crystal has the aspect ratio of virtually unity, it does not depend on the polarization direction of incident light. Accordingly, the degree of freedom of the light source of the incident light is increased and the whole size of the optical system can be made compact.

As the wavelength conversion element according to the present invention is formed by combining the prismatic ferroelectric single crystals, only the broken prismatic ferroelectric single crystal in the manufacturing process has only to be discarded, and the yield thereof is improved. Moreover, on the time of use thereof, only the broken prismatic ferroelectric single crystal has to be exchanged, so that the cost of the users may be reduced. Also, because the optical element and the light generating apparatus are formed by arbitrarily combining the prismatic ferroelectric single crystals, the degree of freedom to meet user's needs is high, and they may be adjustable arbitrarily.

Embodiment 4 of the Invention According to the First Means

Figure 10:
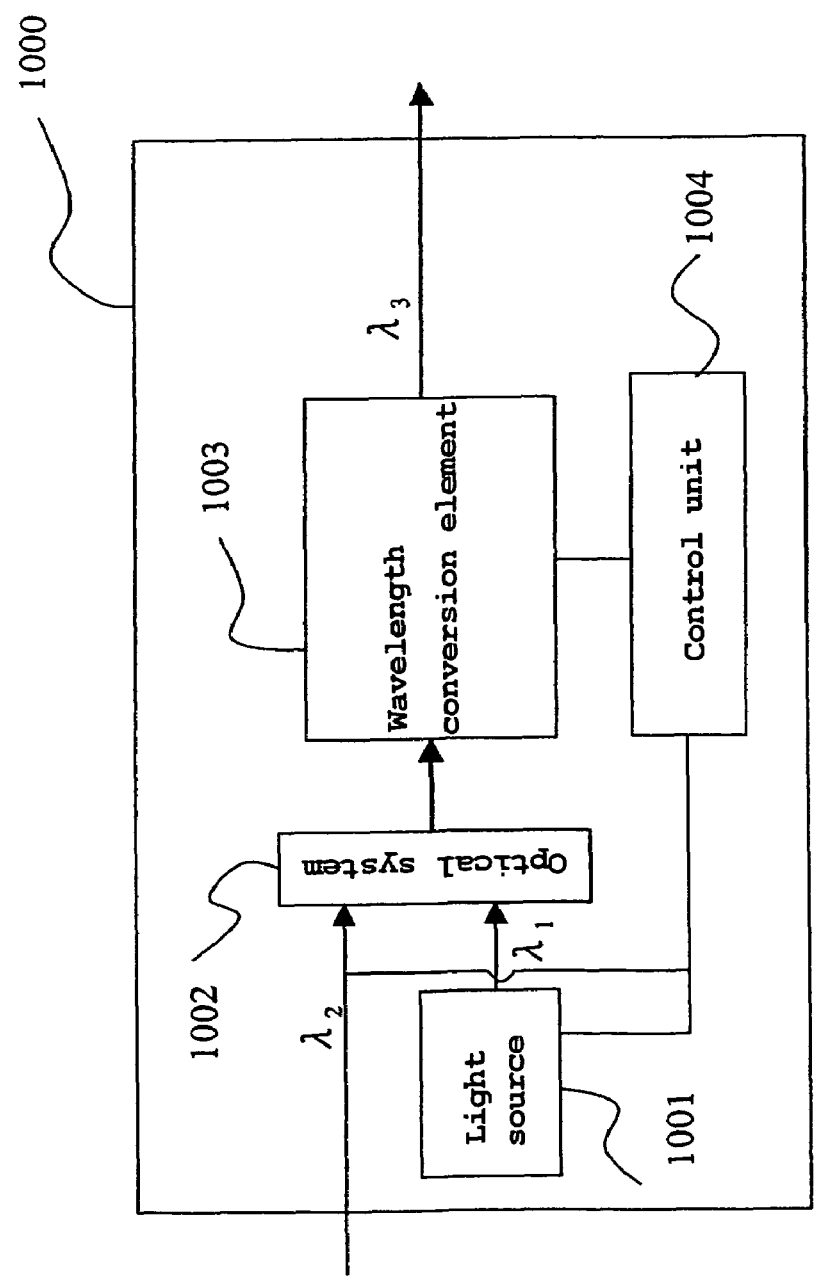
FIG. 10 is a diagram illustrating a light generating apparatus utilizing the difference frequency generation according to the first means or second means of the present invention.

FIG. 10 is a diagram illustrating a light generating apparatus utilizing the difference frequency generation according to Embodiment 4 according to the first means of the present invention.

A light generating apparatus 1000 comprises a light source 1001, an optical connecting system 1002, a wavelength conversion element 1003 and a control unit 1004.

The light source 1001 emits the first light (the pump light) having the first wavelength $\lambda_1$. In the present invention, the polarization of the first light may be either a TM mode or a TE mode. The light source 1001 can be a semiconductor laser with the first wavelength, $\lambda_1 = 0.78$ μm. A tunable light source may be adopted as the light source 1001.

The optical connecting system 1002 is an arbitrary optical system for connecting the first light from the light source 1001 and the second light (the signal light) having the wavelength $\lambda_2$. The second light is, for example, a light in the C band (1.53 μm-1.57 μm) that is a typical communication band for wavelength division multiplexing (WDM). The first wavelength $\lambda_1$ and the second wavelength $\lambda_2$ satisfy the relation: $\lambda_1 < \lambda_2$.

The wavelength conversion element 1003 is any one of the wavelength conversion elements 300, 400, 600, 610, and 700, explained in Embodiment 1, or a variation example thereof. The wavelength conversion element 1003 converts the first light and the second light connected in the optical connecting system 1002 into the third light (the output light) having the third wavelength $\lambda_3$.

In this case, each of said plural prismatic ferroelectric single crystals in the wavelength conversion element 1003 has a domain inversion structure with a predetermined period enabling quasi-phase-matching in the direction perpendicular to respective polarization direction, so that the first wavelength $\lambda_1$, the second wavelength $\lambda_2$ and the third wavelength $\lambda_3$ satisfy the relation: $1/\lambda_1 - 1/\lambda_2 = 1/\lambda_3$. The prismatic ferroelectric single crystal is not limited to MgSLT.

The control unit 1004 controls the position of the wavelength conversion element 1003 so that the first light and the second light connected in the optical connecting system 1002 irradiate the predetermined prismatic ferroelectric single crystal in the wavelength conversion element 1003. The control unit 1004 may obtain the information the first light possesses (e.g., wavelength, polarization) from the light source 1001 and the information the second light possesses (e.g., wavelength, polarization) and may control the position of the wavelength conversion element 1003 based on the obtained information. The control unit 1004, for example, may store the data about the period dependence and the data about the temperature dependence of the signal light and the output light of the prismatic ferroelectric single crystal, and may control the position of the wavelength conversion element 1003 based on these data.

The light generating apparatus 1000 may be equipped with reflecting mirrors (not shown) between the optical connecting system 1002 and the wavelength conversion element 1003, and on the light-emitting side of the wavelength conversion element 1003, respectively, and may be made to function as a resonator.

Next, the operation of the light generating apparatus 1000 is explained.

For example, when the user wants to convert a second light (in C band) with the second wavelength $\lambda_2=1.55$ μm into a third light with a wavelength in L band, using the first light with a wavelength $\lambda_1=0.78$ μm, the control unit 1004 controls the position of the wavelength conversion element 1003 based on the information the first light possesses (e.g., wavelength, polarization) and the information the second light possesses (e.g., wavelength, polarization) and the like. In this case, the control unit 1004 controls the position of the wavelength conversion element 1003, so that the first light and the second light connected in the optical connecting system 1002 are incident on the prismatic ferroelectric single crystal having the polarization reversal period of 17 μm, for example. The first light and the second light incident on the predetermined prismatic ferroelectric single crystal in the wavelength conversion element 1003 are converted into the third light with the third wavelength, $\lambda_3=1.57$ μm, satisfying the above relation. Thus converted third wavelength $\lambda_3$ is in L band (1.57 μm-1.62 μm), a typical communication band for wavelength division multiplexing (WDM).

The light generating apparatus 1000 according to the above-mentioned Embodiment 4 comprises the wavelength conversion element having multi-gratings formed by combining the prismatic ferroelectric single crystals with the predetermined periods. Thus, if the light source 1001 is a tunable light source, the element can tunably adjust the fixed C band wavelength (the second wavelength $\lambda_2$ of the second light) to the L band wavelength (the third wavelength $\lambda_3$).

Also, when the light source 1001 emits a single frequency light, the wavelength in L band (the third wavelength $\lambda_3$) can be tunably adjusted by adopting variable wavelength in C band (the second wavelength $\lambda_2$ of the second light).

Thus, C-L band-conversion can be conducted tunably. As explained in Embodiment 1, since the prismatic ferroelectric single crystal has the aspect ratio of substantially unity, it does not depend on the polarization direction of incident light. Accordingly, the degree of freedom of the light source of the incident light is increased and the whole size of the optical system can be made compact.

As the wavelength conversion element 1003 of the light generating apparatus 1000 according to the present invention is formed by combining the prismatic ferroelectric single crystals, only the broken prismatic ferroelectric single crystal in the manufacturing process has to be discarded, and the yield thereof is improved. Moreover, on the time of use thereof, only the broken prismatic ferroelectric single crystal has to be exchanged, so that the cost of the users may be reduced. Because the wavelength conversion element 1003 of the light generating apparatus 1000 according to the present invention is formed by arbitrarily combining the prismatic ferroelectric single crystals, adjustments to meet user's needs may be possible.

Difference frequency generation has been explained using the light generating apparatus 1000 shown in FIG. 10, but it should be noted that sum-frequency generation using the light generating apparatus 1000 is also possible. In this case, each of the plural prismatic ferroelectric single crystals in the wavelength conversion element 1003 may has a domain inversion structure with a predetermined period enabling quasi-phase-matching in the direction perpendicular to the polarization direction, so that the first wavelength $\lambda_1$, the second wavelength $\lambda_2$ and the third wavelength $\lambda_3$ satisfy the relation: $1/\lambda_1+1/\lambda_2=1/\lambda_3$.

Embodiment 1 of the Invention According to the Second Means

Figure 11:
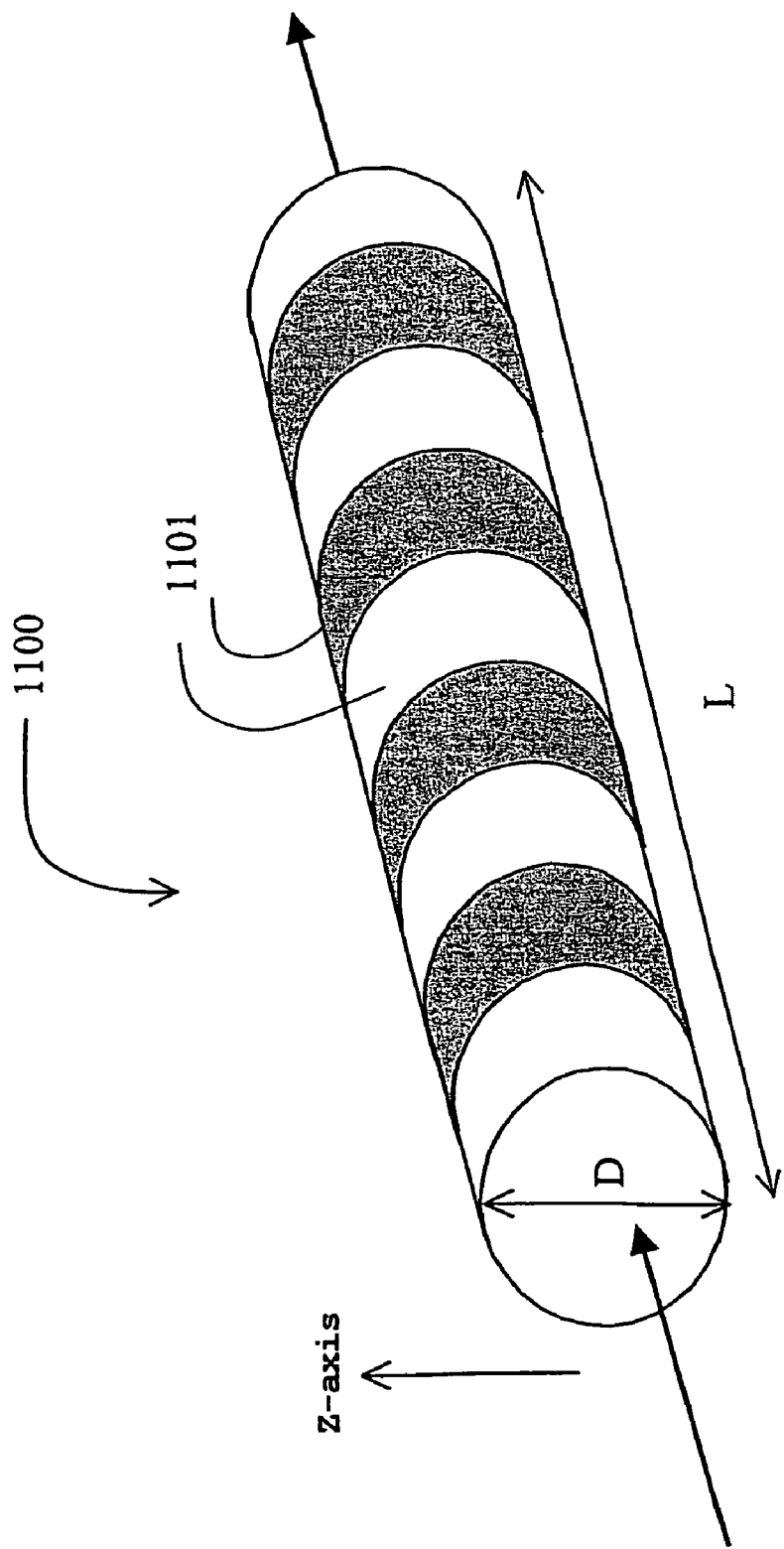
FIG. 11 is a perspective view of a wavelength conversion element according to the second means of the present invention.

FIG. 11 is a perspective view of a wavelength conversion element comprising a cylindrical ferroelectric single crystal according to Embodiment 1 of the second means of the present invention.

The cylindrical ferroelectric single crystal 1100 can use, for example, the MgSLT shown in FIG. 1. The diameter of the cross-section of the cylindrical ferroelectric single crystal 1100 is, for example, 1.5 mm. The cylindrical ferroelectric single crystal 1100 has a periodically poled structure 1101 with a predetermined period in a direction perpendicular to the polarization direction thereof. That is, one cylindrical ferroelectric single crystal 1100 has a single grating. In the figure, the cross-section shows a plane parallel to the polarization direction of the cylindrical ferroelectric single crystal 1100, but is not limited to this.

Now, the above-predetermined period is explained. In the case when the parametric oscillation is generated using the cylindrical ferroelectric single crystal 1100, let the wavelength of the incident light on the cylindrical ferroelectric single crystal 1100 be denoted by $\lambda_1$, and the wavelengths of the lights emitted from the cylindrical ferroelectric single crystal 1100 be denoted by $\lambda_2$ and $\lambda_3$, then the range of the polarization reversal period in which the first, second and third lights are quasi-phase-matched is determined in a way that the relation: $1/\lambda_1=1/\lambda_2+1/\lambda_3$ and the relations: $\lambda_1<\lambda_2$ and $\lambda_1<\lambda_3$ are satisfied.

Similarly, in the case when the second harmonic is generated using the cylindrical ferroelectric single crystal 1100, let the wavelength of the light incident on the cylindrical ferroelectric single crystal 1100 be denoted by $\lambda_1$, and the wavelengths of the light emitted from the cylindrical ferroelectric single crystal 1100 be denoted by $\lambda_2$, then the range of the polarization reversal period in which the first and the second lights are quasi-phase-matched is determined in a way that the relation: $\lambda_1=2\times\lambda_2$ is satisfied.

Similarly, in the case of difference frequency generation or sum frequency generation using the cylindrical ferroelectric single crystal 1100, let the wavelengths of the lights incident on the cylindrical ferroelectric single crystal 1100 be denoted by $\lambda_1$ and $\lambda_2$, and the wavelengths of the light emitted from the cylindrical ferroelectric single crystal 1100 be denoted by $\lambda_3$, then the polarization reversal period in which the first, second and third lights are quasi-phase-matched is determined in a way that the relation: $1/\lambda_1\pm1/\lambda_2=1/\lambda_3$ is satisfied. When the cylindrical ferroelectric single crystal 1100 is MgSLT, the polarization reversal period for the parametric oscillation is selected within the range from 26 μm to 33 μm, and the polarization reversal period for the second harmonic is selected within the range from 1 μm to 10 μm.

In the case of difference frequency generation, an arbitrary polarization reversal period is adopted dependent on the wavelength $\lambda_2$. It should be noted that these polarization reversal periods are peculiar to the ferroelectric single crystal.

The length L of the cylindrical ferroelectric single crystal 1100 in the direction perpendicular to the polarization direction is, for example, 35 mm. The diameter D at the arbitrary position (for example, in a direction of Z-axis) of the cross-section of the cylindrical ferroelectric single crystal 1100 is 1.5 mm. It should be noted that these length L and diameter D are only examples, and are not limited to these values.

In producing such a cylindrical ferroelectric single crystal 1100, for example, a prismatic ferroelectric single crystal is first cut out. Next, the periodically poled structure 1101 can be formed in the prismatic ferroelectric single crystal cut out by an arbitrary method such as an electric field poling process, an electron beam scanning irradiation method or a proton exchange heat treatment method or the like. After that, the cylindrical ferroelectric single crystal is punched out using a predetermined mold (e.g., a hollow body). However, methods for producing the cylindrical ferroelectric single crystal 1100 are not limited to this. Also, in order to recognize the Z-axis direction, an orientation flat may be provided at a predetermined position. A reflective film may be equipped at the edge faces of the cylindrical ferroelectric single crystal 1100.

The cross-section of the cylindrical ferroelectric single crystal 1100 according to the present invention is virtually completely round. The term, virtually completely round, indicates that ratio of two diameters of the cross-section at arbitrary different two positions is not completely equal to unity but the degree of deterioration in the characteristics of a device, brought about when such cylindrical ferroelectric single crystal 1100 is used, does not matter in the usual designs of the device.

Thus, since the cross-section of the cylindrical ferroelectric single crystal 1100 is virtually completely round, an arrangement of the cylindrical ferroelectric single crystal 1100 can be changed dependent on polarization of the incident light. That is, by only changing the arrangement angle of the cylindrical ferroelectric single crystal 1100, the wavelength of a light with an arbitrary polarization can be converted.

The operation of the wavelength conversion element 1100, in the case when the second harmonic is generated using the wavelength conversion element (the cylindrical ferroelectric single crystal) 1100 shown in FIG. 11, is explained here.

The wavelength conversion element 1100 can be used together with a light source (not shown) and a light collecting optical system (not shown). The light source can be a semiconductor laser emitting the first light (the fundamental light) with a first wavelength $\lambda_1$ of 780 nm, but not limited to this. An arbitrary light source can be used as far as the light source is coherent. The light collecting optical system can be an arbitrary optical system which collects the first light and functions to make it be incident on the wavelength conversion element 1100.

The first light emitted from the light source is incident on the wavelength conversion element 1100 through the light collecting optical system. The periodically poled structure 1101 is repeated periodically in the propagation direction of the first light (the fundamental wave) from the light source. By this periodically poled structure 1101, the fundamental wave and the second harmonic are quasi-phase-matched. In this way, the fundamental wave is converted into the second light (the second harmonic) with the second wavelength $\lambda_2$ of 390 nm during the propagation through the wavelength conversion element 1100. In addition, reflecting films may be provided at the plane on which the fundamental light is incident and the exit plane on the wavelength conversion element 1100, and make the wavelength conversion element 1100 function as a resonator.

As mentioned above, since the wavelength conversion element 1100 of this embodiment consists of a cylindrical ferroelectric single crystal, the arrangement angle of the cylindrical ferroelectric single crystal can be changed dependent on the polarization of the first light. That is to say, the wavelength conversion element 1100 can convert the wavelength of a light with arbitrary polarization. As a result, the degree of freedom to the polarization of the light source becomes higher and an arbitrary light source can be used. The arrangement angle of the cylindrical ferroelectric single crystal may be changed manually or by machine control.

Even if a thermal distribution is caused in the wavelength conversion element 1100 by irradiation of the first light, the thermal distribution is centrosymmetric because the cross-section of the cylindrical ferroelectric single crystal 1100 is virtually completely round. It should be noted that the first light is irradiated on the center of the wavelength conversion element 1100 in this case. Therefore, as the thermal birefringence is reduced due to centrosymmetric thermal distribution, a high extinction ratio (i.e., a high linearity of polarization) of the light propagating wavelength conversion element 1100 can be maintained, and the shape of the light emitted from the wavelength conversion element 1100 can be maintained to be circular without distortion.

It should be understood that the parametric oscillation and the difference frequency generation can be prosecuted in the similar way using the wavelength conversion element 1100. These have been already explained according to FIG. 5, and explanations are omitted here.

In addition to controlling the period of the domain inversion structure, if the temperature of the cylindrical ferroelectric single crystal 1100 is controlled, an even more precisely controlled tunability can be accomplished.

Figure 12:
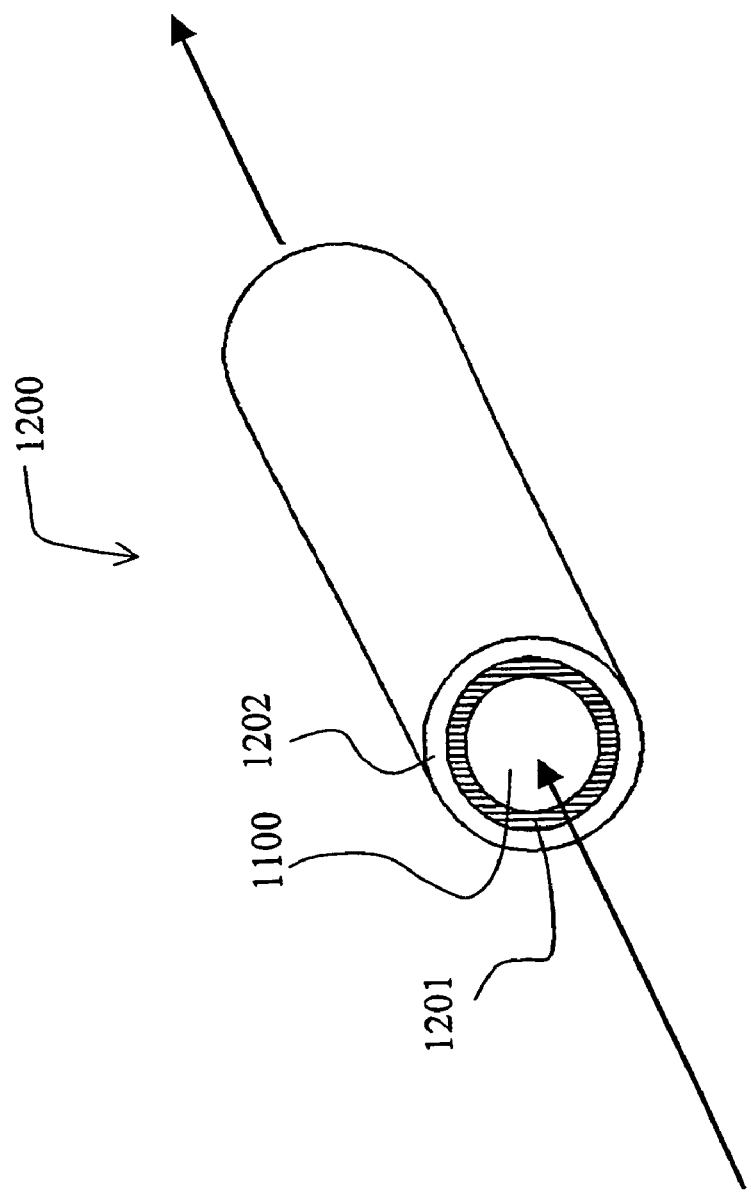
FIG. 12 is a perspective view showing another embodiment of a wavelength conversion element according to the second means of the present invention.

FIG. 12 is a perspective view of another wavelength conversion element comprising a cylindrical ferroelectric single crystal in Embodiment 1 of the invention according to the second means of the present invention.

The wavelength conversion element 1200 shown in FIG. 12 is the same as the wavelength conversion element 1100 illustrated in FIG. 11, except for having a temperature control element 1201 and a frame 1202 covering the temperature control element 1201. As explained with reference to FIG. 5, as the cylindrical ferroelectric single crystal of MgSLT has tunability by the temperature, an even more precisely controlled tunability can be achieved by disposing the temperature control element 1201 in the cylindrical ferroelectric single crystal 1100. Further, frame 1202 surrounding the temperature control element 1201 is made of heat-insulating material. Thus, dissipation of heat from the temperature controlling element 1201 can be prevented and the cylindrical ferroelectric single crystal 1100 can be heated uniformly, and together with these, injury of the user by the heat of the temperature control element 1201 can be avoided. Although the temperature control element 1201 covers the whole cylindrical ferroelectric single crystal 1100 in the figure, any temperature control element can be used as long as the temperature of the cylindrical ferroelectric single crystal 1100 can be kept uniform. The temperature control element 1201 can be, for example, a Peltier element.

The wavelength conversion element 1200 may be further equipped with a control unit (not shown) to control the temperature control element 1201. Such a control unit has the temperature dependence of the output light wavelength peculiar to the ferroelectric single crystal as shown in FIG. 5, and thus this control unit may utilize this dependence information to control the temperature control element 1201 for keeping an appropriate temperature of the cylindrical ferroelectric single crystal 1100. In addition to the temperature control, the control unit may obtain the information about the polarization of the incident light on the wavelength conversion element 1200 and may control the wavelength conversion element 1200 to change the angle arrangement thereof dependent on the polarization of the incident light.

As explained above referring to FIGS. 11 and 12, the cross-sections of the wavelength conversion elements 1100 and 1200 comprising the cylindrical ferroelectric single crystal according to the present invention are virtually completely round, so that the thermal distribution is necessarily centrosymmetric, even if a thermal distribution is caused by the incident light on the wavelength conversion element. As a result, a high extinction ratio (i.e., high linearity of polarization) of light can be maintained and the shape of the output light from the wavelength conversion element 1100 and 1200 can be kept circular.

Also, since the cross-section of the cylindrical ferroelectric single crystal is virtually completely round, the element can easily respond to polarization of the incident light by only changing the arrangement angle of the cylindrical ferroelectric single crystal. Accordingly, the whole system can be made compact, since an optical system such as a polarizer or the like is not needed. Also, an arbitrary light source can be used.

Moreover, the cylindrical ferroelectric single crystal has no edges, so that there is no danger of unnecessary crack generation in the crystal due to failures of edges.

Embodiment 2 of the Invention According to the Second Means

Figure 13:
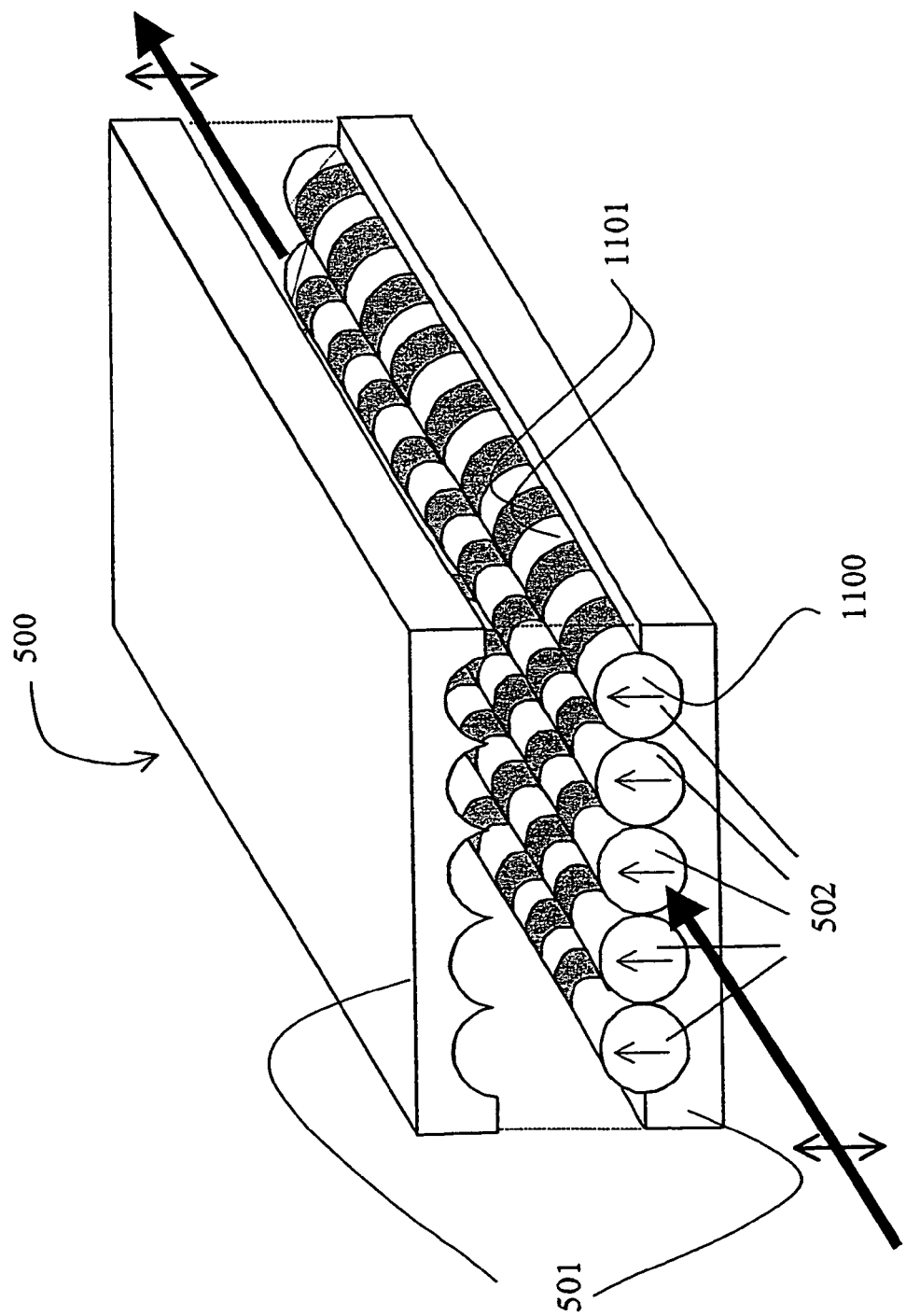
FIG. 13 is a perspective view showing another embodiment of a wavelength conversion element according to the second means of the present invention.

FIG. 13 is a perspective view of a wavelength conversion element of Embodiment 2 according to the second means of the present invention.

The wavelength conversion element 500 comprises a holder 501 and plural cylindrical ferroelectric single crystals 502.

In the holder 501, plural cylindrical ferroelectric single crystals 502 are accommodated. The size (length, width, and thickness) of the holder 501 can be modified dependent on the number of the cylindrical ferroelectric single crystals 1100 accommodated and the arrangement of plural cylindrical ferroelectric single crystals 502. In the figure, the holder 501 consists of a base and a cover having semicircular hollows, but the construction of the holder 501 is not limited to this construction. For example, the holder may be a rectangular tube.

The holder 501 is preferably made of heat-conductive material such as copper. As explained in Embodiment 1, the thermal distributions of the plural cylindrical ferroelectric single crystal 502 caused by the irradiation of the incident light is necessarily centrosymmetric. Therefore, even if a thermal distribution is caused in the cylindrical ferroelectric single crystal 1100, a high extinction ratio (i.e., a high linearity of polarization) of light can be maintained. However, if the holder 501 is made of heat-conductive material, heat due to the irradiation of incident light can easily be dissipated and generation of the heat distribution can be reduced.

The plural cylindrical ferroelectric single crystals 502 are arranged so that the direction perpendicular to the polarization direction of each crystal is the same as those of other crystals. In this way, multi-gratings can be easily achieved. In the figure, for simplicity, five cylindrical ferroelectric single crystals 502 are placed in a plane, and are arranged so that the polarization directions of the each crystal are the same. However, the number of the cylindrical ferroelectric single crystal 1100 and the arranging manner thereof may be arbitrarily determined as long as the direction perpendicular to the polarization direction of each cylindrical ferroelectric single crystal 1100 is the same as those of others. The polarization reversal period of each of the plural cylindrical ferroelectric single crystals 502 are selected according to user's needs from within the predetermined ranges of the periods to achieve the parametric oscillation, the second harmonic generation, or difference frequency generation explained in Embodiment 1. The polarization reversal periods of each of the plural cylindrical ferroelectric single crystals 502 are different with each other.

In this way, the wavelength conversion element 500 according to the second means of the present invention accomplishes the multi-gratings by arbitrarily combining single cylindrical ferroelectric single crystals 1100 each having a single grating. Thus, when any cylindrical ferroelectric single crystal out of the plural cylindrical ferroelectric single crystals (multi-gratings) 502 is broken upon manufacturing the wavelength conversion element 500, only the exchange of the broken cylindrical ferroelectric single crystal may be enough, so that the yield may be improved. Also, even if a crack is generated in one cylindrical ferroelectric single crystal at the time of using the wavelength conversion element 500, it does not propagate into the neighboring cylindrical ferroelectric single crystals. Accordingly, only the cracked cylindrical ferroelectric single crystal has to be changed, and the user's cost can be reduced.

Next, the operation of the wavelength conversion element 500 is explained.

The light from outside (e.g. light source) the wavelength conversion element 500 (the incident light) is incident on a cylindrical ferroelectric single crystal having a specific polarization reversal period among the plural cylindrical ferroelectric single crystals 502 in order to be converted into the light having the desired wavelength. Depending on the polarization reversal period of the wavelength conversion element 500, the wavelength of the incident light is converted based on the parametric oscillation, the second harmonic generation, or the difference frequency generation. Then, the wavelength conversion element 500 emits the output light.

For example, in the case of the parametric oscillation, when the wavelength of the pump light (incident light) is 1.064 μm and the specific polarization reversal period is 31.8 μm, the wavelengths of the idler light and signal light (output lights) are 2.5 μm and 1.85 μm, respectively. In this way, the tunability can be accomplished by moving the wavelength conversion element 500 manually or by machine control so that the incident light irradiates the cylindrical ferroelectric single crystal having a specific polarization reversal period.

As the wavelength conversion element 500 comprises the plural cylindrical ferroelectric single crystals 502, the arrangement angle of each of the plural cylindrical ferroelectric single crystals can be changed in accordance with the polarization of the incident light. That is, the wavelength conversion element 500 can convert the wavelength of the light with an arbitrary polarization. Accordingly, the degree of freedom of the light source for the polarization of the light source is improved and an arbitrary light source can be used. The arrangement angle of each of the plural cylindrical ferroelectric single crystals can be changed manually or by machine control.

By shaping each of the cross-sections of the plural cylindrical ferroelectric single crystals 502 to be virtually completely round, the wavelength can be converted without providing an optical system such as a polarizer or the like between the light source (not shown) of the incident light and the wavelength conversion element 500, whether the polarization mode of the incident light is a TE mode or a TM mode. Accordingly, the whole system can be made compact.

Figure 14:
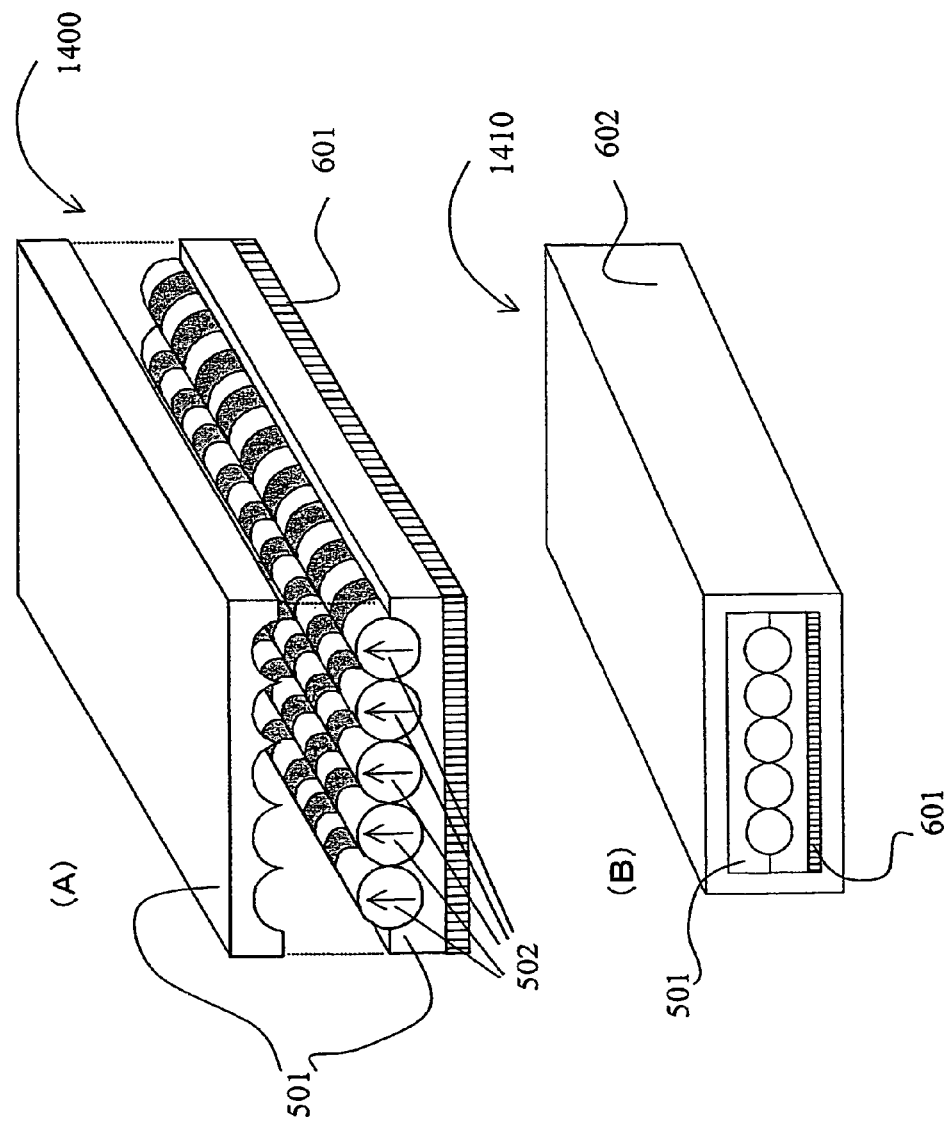
FIG. 14 is a perspective view showing another embodiment of a wavelength conversion element according to the second means of the present invention.

FIG. 14 is a perspective view of still another wavelength conversion element according to Embodiment 2 of the present invention.

In FIG. 14 (A), the wavelength conversion element 1400 is the same as the wavelength conversion element 500 explained with reference to FIG. 13, except for having the temperature control element 601. As explained with reference to FIG. 5, since the cylindrical ferroelectric single crystal of MgSLT, for example, has tunability by the temperature, an even more precisely controlled tunability can be achieved by providing a temperature control element 601 in the wavelength conversion element 500. Although the temperature control element 601 has a sheet shape in the figure, any temperature control element can be used as the temperature control element 601, as far as the temperature of the plural cylindrical ferroelectric single crystal 502 can be held uniform. The temperature control element 601 can be, for example, a Peltier element.

In FIG. 14 (B), the wavelength conversion element 1410 is equipped with a frame 602 surrounding the temperature control element 601. The frame 602 is made of heat-insulating material. By surrounding a holder 501 and the temperature control element 601 with the heat-insulating frame 602 in this way, the heat dissipation of temperature control element 601 is prevented; plural cylindrical ferroelectric single crystals 502 can be heated uniformly; and injury of the user by the heat of the temperature control element 601 can be avoided.

The wavelength conversion element 1400 or 1410 may be further equipped with a control unit (not shown) to control the temperature control element 601. Such a control unit has the polarization reversal period dependence of the emitted wavelengths, peculiar to the ferroelectric single crystal material shown in FIG. 1, and/or the temperature dependence of the emitted wavelengths peculiar to the ferroelectric single crystal shown in FIG. 5, and thus this control unit may utilize these dependences to control the temperature control element 601 to keep the wavelength conversion element 1400 or 1410 at an appropriate temperature. In addition to the temperature control, the control unit may obtain the information about the polarization of the incident light on the wavelength conversion element 1400 or 1410 and may control the wavelength conversion element 1400 or 1410 to change the angle arrangement thereof dependent on the polarization of the incident light.

Figure 15:
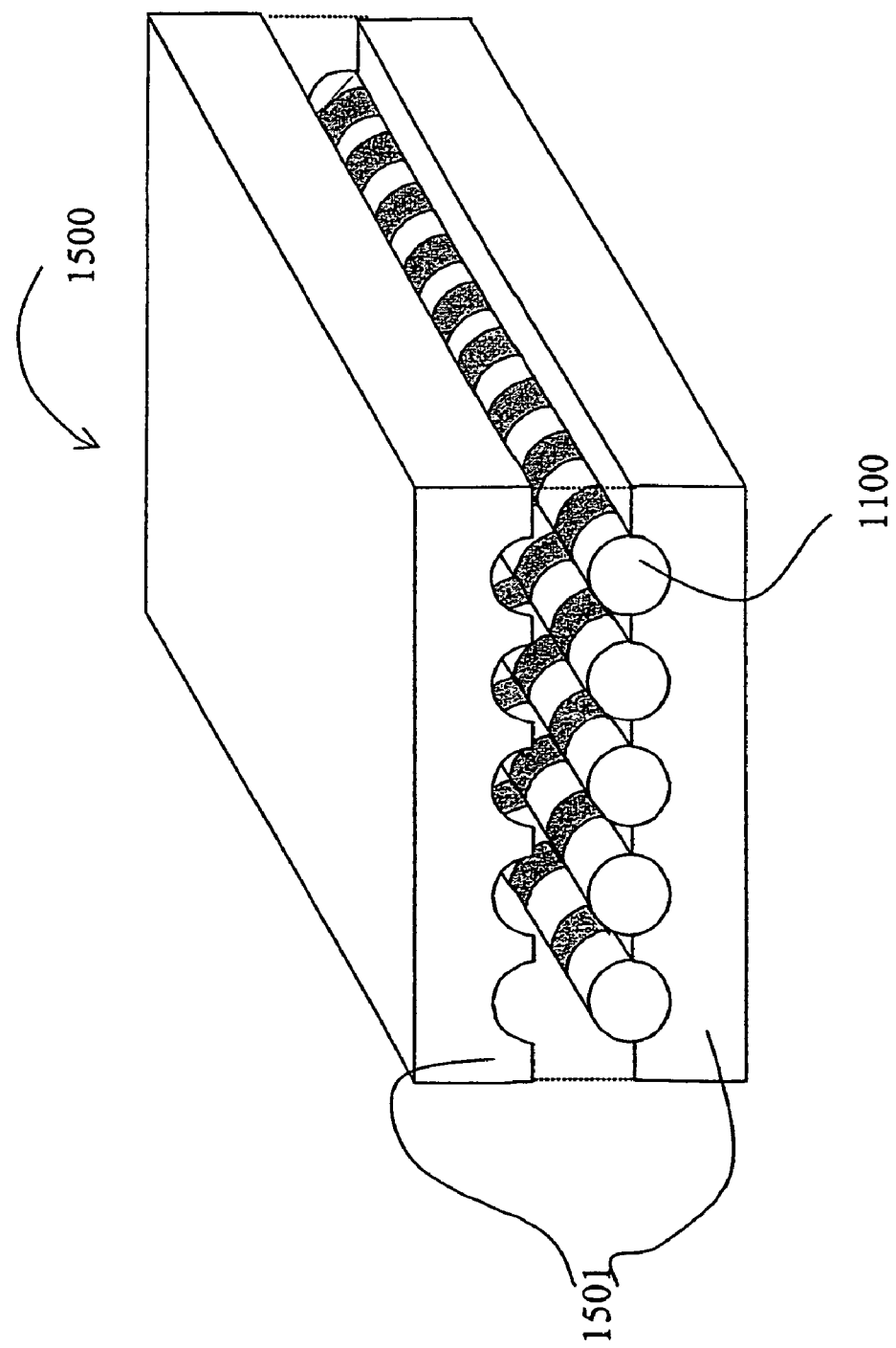
FIG. 15 is a perspective view showing another embodiment of a wavelength conversion element according to the second means of the present invention.
Figure 16:
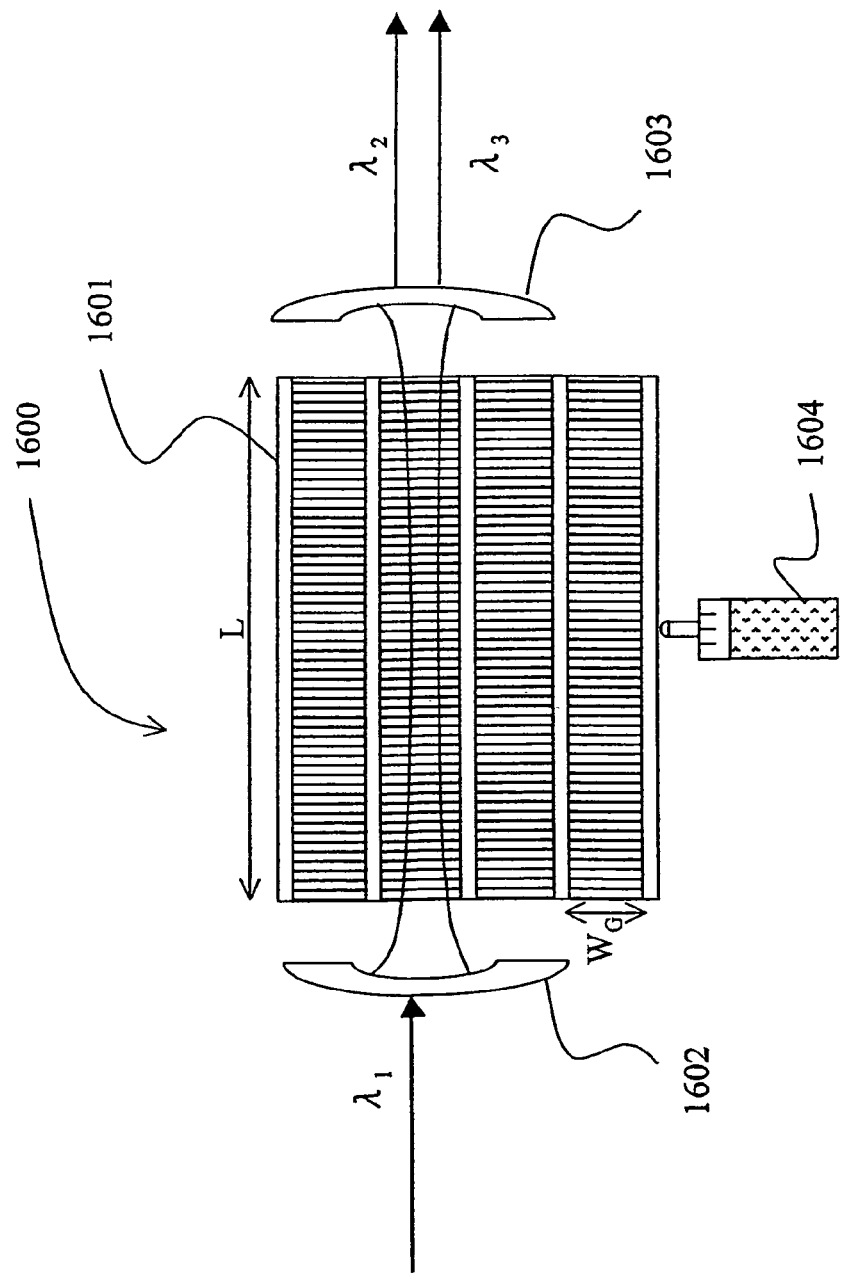
FIG. 16 is a schematic diagram showing a multi-grating type quasi-phase-matched (QPM) parametric oscillator (OPO) according to a prior art.
Figure 17:
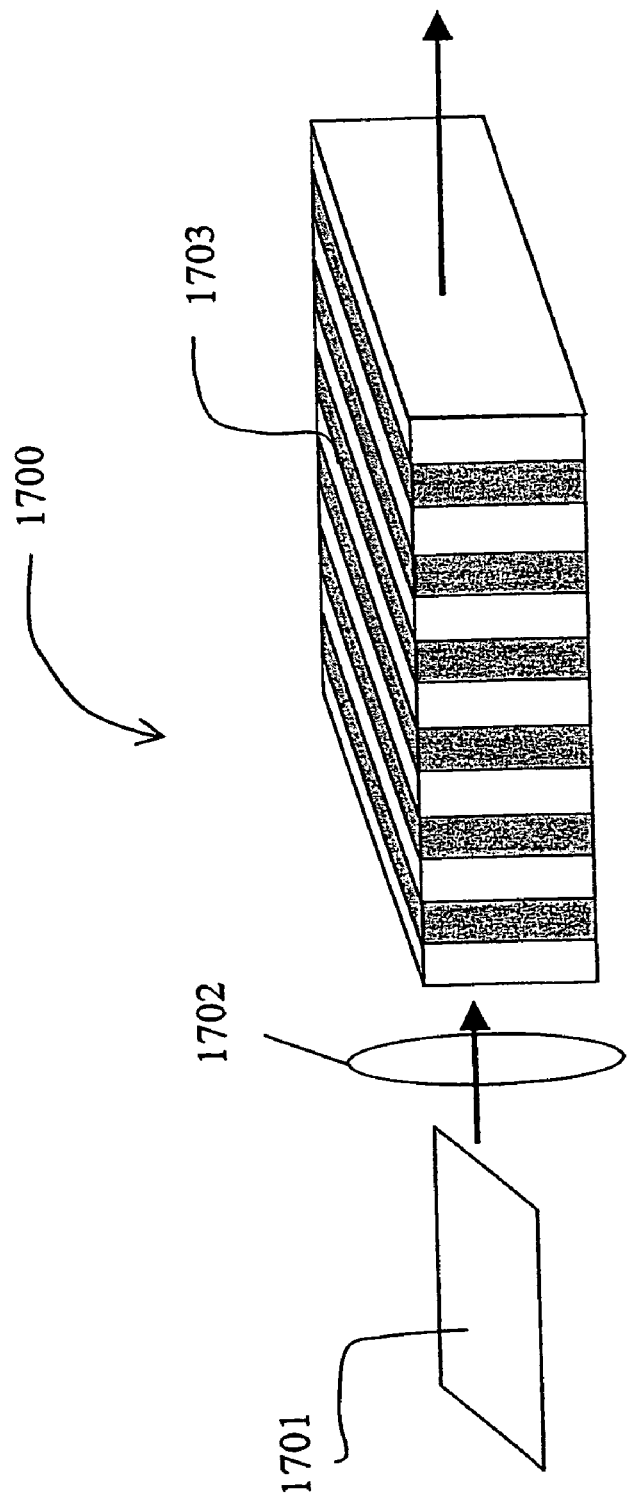
FIG. 17 is a diagram showing a wavelength conversion system according to a prior art.

FIG. 15 is a perspective view of a still another wavelength conversion element according to Embodiment 2 of the invention according to the second means of the present invention.

The wavelength conversion element 1500 is the same as the wavelength conversion element 500 explained with reference to FIG. 13, except that the plural cylindrical ferroelectric single crystals are arranged with spaces having predetermined width and the spaces in the holder 1501 are filled with heat-conductive material. Thus, by filling the spaces between each of the cylindrical ferroelectric single crystals with the heat-conductive material, a heat possible to be generated by the incident light within the cylindrical ferroelectric single crystal can be dissipated and the generation of heat distribution can be reduced. As a result of this, the birefringence effect caused by heat is reduced, and the polarization mode of the light propagating in the wavelength conversion element 1500 is maintained, and the conversion efficiency can be kept constant. The predetermined width of the space is, for example, 50 µm, but not limited to this width. In this case, the example wherein the holder and the heat-conductive material are integrated in one, is shown, but they may be independent.

As explained above, the tunability of the wavelength conversion can be easily achieved, by combining the cylindrical ferroelectric single crystals each having a domain inversion structure with a predetermined period to construct a wavelength conversion element having multi-gratings. The cylindrical ferroelectric single crystal has a cross-section virtually completely round, so that it does not depend on the polarization direction of the incident light. Accordingly, the degree of freedom of the light source of the incident light may be increased and the whole size of the optical system can be made compact. Also, as the thermal distribution caused by the incident light is centrosymmetric, a high extinction ratio (i.e., a high linearity of polarization) of the light can be maintained, even if a thermal distribution is caused.

As the wavelength conversion element according to the present invention is formed by combining the cylindrical ferroelectric single crystals, only the broken cylindrical ferroelectric single crystal in the manufacturing process has to be discarded, and the yield thereof is improved. Moreover, on the time of use thereof, only the broken cylindrical ferroelectric single crystal has to be exchanged, so that the cost of the users may be reduced. Because the wavelength conversion element according to the present invention is formed by arbitrarily combining the cylindrical ferroelectric single crystals, adjustments to meet user's needs may be possible.

In Embodiment 2 of the invention according to the second means of the present invention, examples of the wavelength conversion elements have been shown using the cylindrical ferroelectric single crystal 1100 of MgSLT, explained referring to FIG. 11. It should be understood that these are only examples. Above mentioned effects can be realized, if an arbitrary ferroelectric single crystal material is used and plural cylindrical ferroelectric single crystals having the cross-section with diameter of at least 2 mm and having virtually completely round cross-section are used.

Embodiment 3 According to the Second Means

The invention according to the second means of the present invention further includes an invention related to light generating apparatus utilizing parametric oscillation as an embodiment. The constitution thereof is basically the same as that of the light generating apparatus shown in FIG. 8, except that the wavelength conversion element in FIG. 8 uses prismatic ferroelectric substance on one hand, but in this case, uses cylindrical ferroelectric substance on the other hand. Hereinafter, this light generating apparatus is explained based on FIG. 8.

The light generating apparatus 800 utilizing the parametric oscillation according to Embodiment 3 of the present invention comprises a light source 801, the wavelength conversion element 802, and the control unit 803.

The light source 801 emits the first light (the pump light) having the wavelength $\lambda_1$. In the present invention, polarization of the first light may be either a TM mode or a TE mode. The light source 801 is a Q-switch Nd:YAG laser with the first-wavelength of $\lambda_1=1.064$ µm, for example. A tunable light-source may be used for the light source 801.

The wavelength conversion element 802 is any one of the wavelength conversion elements 500, 1400, 1410 and 1500 explained for the Embodiment 2 already, or a variation example thereof. The wavelength conversion element 802 converts the first light received from the light source 801 into the second light (a signal light) with the second wavelength $\lambda_2$ and the third light (an idler light) with the third wavelength $\lambda_3$.

At that time, each of the plural cylindrical ferroelectric single crystals in the wavelength conversion element 802 has a domain inversion structure with a predetermined period enabling quasi-phase-matching in the direction perpendicular to the polarization direction thereof so that the first wavelength $\lambda_1$, the second wavelength $\lambda_2$ and the third wavelength $\lambda_3$ satisfy the relation $1/\lambda_1 = 1/\lambda_2 + 1/\lambda_3$ and the relations $\lambda_1 < \lambda_2$ and $\lambda_1 < \lambda_3$. When the MgSLT shown in FIG. 1 and FIG. 5 is used for the cylindrical ferroelectric single crystal, the polarization reversal periods of the cylindrical ferroelectric single crystals are selected from within the range from 26 μm to 33 μm. The cylindrical ferroelectric single crystal is not limited to MgSLT.

The control unit 803 controls the position of the wavelength conversion element 802. Particularly, the control unit 803 obtains the information the first light possesses (e.g., wavelength, polarization) from the light source 801 and control the position of the wavelength conversion element 802, based on the obtained information. In this description, "to control the position of the wavelength conversion element 802" means that the control unit 803 controls the arrangement angle of each of the plural cylindrical ferroelectric single crystals of the wavelength conversion element so as to respond to the polarization mode of the first light based on the information about the polarization mode among the information which the first light from the light source 801 possesses, and/or that the control unit 803 controls the position of the wavelength conversion element 802 based on the information about the wavelength among the information the first light from the light source 801 possesses, so that the first light emitted from the light source 801 irradiates the predetermined cylindrical ferroelectric single crystal in the wavelength conversion element 802.

The control unit 803, for example, may store the data about the period dependence and the data about the temperature dependence of the idler light and the signal light of the cylindrical ferroelectric single crystal shown in FIG. 1 and FIG. 5 and may control the position of the wavelength conversion element 802, based on these data.

The light generating apparatus 800 may be provided with reflecting mirrors (not shown) between the light source 801 and the wavelength conversion element 802, and on the light-emitting side of the wavelength conversion element 802, respectively, and may be made to function as a resonator.

Next, the operation of the light generating apparatus 800 is explained.

The light source 801 emits the first light having the first wavelength $\lambda_1 = 1.064$ μm to the wavelength conversion element 802. The control unit 803 controls the position of the wavelength conversion element 802, based on the information the first light possesses (e.g., wavelength, polarization), so that the user can obtain a light with a desired wavelength. For example, when the user wants to obtain the third light (the idler light) with a wavelength $\lambda_3 = 3.62$ μm, the control unit 803 controls the position of the wavelength conversion element 802 so that the first light is incident on the cylindrical ferroelectric single crystal having the polarization reversal period of 30 μm.

The first light incident on the predetermined cylindrical ferroelectric single crystal in the wavelength conversion element 802 is converted into the second light (a signal light) with the second wavelength $\lambda_2 = 1.507$ μm and the third light (an idler light) with the third wavelength $\lambda_3 = 3.62$ μm, satisfying the above relation. The second light converted in this way is in the wavelength band for optical communications and can be utilized in the optical communications. The third light is in the wavelength band effective for the gas spectroscopy, and may be available to chemical analyses.

The light generating apparatus 800 according to the second means of the present invention comprises the wavelength conversion element 802 having multi-gratings formed by combining the cylindrical ferroelectric single crystals with the predetermined periods. Thereby, a tunability of the conversion wavelengths can be easily achieved. As explained in Embodiment 1, since a cross-section parallel to the polarization direction of the cylindrical ferroelectric single crystal is virtually completely round, the thermal distribution should necessarily be centrosymmetric, even when a thermal distribution is caused in the cylindrical ferroelectric single crystal by the light incident on the wavelength conversion element 802. As a result, a high extinction ratio (i.e., a high linearity of polarization) of light can be maintained and the shape of the output light from the wavelength conversion element 802 (the second light and the third light) can be maintained to be circular. Moreover, the wavelength conversion element 802 has no dependence on the polarization direction of the incident light. Accordingly, the degree of freedom of the light source of the incident light is increased and the whole size of the optical system can be made compact.

As the wavelength conversion element 802 of the light generating apparatus 800 according to the second means of the present invention is formed by combining the cylindrical ferroelectric single crystals, only the broken cylindrical ferroelectric single crystal in the manufacturing process has to be discarded, and the yield thereof is improved. Moreover, on the time of use thereof, only the broken cylindrical ferroelectric single crystal has to be exchanged, so that the cost of the users may be reduced. Because the wavelength conversion element 802 of the light generating apparatus 800 according to the present invention is formed by arbitrarily combining the cylindrical ferroelectric single crystals, adjustments to meet user's needs may be possible.

Embodiment 4 of the Inventions According to the Second Means of the Present Invention The invention according to second means of the present invention further includes as an embodiment, an invention relating to a light generating apparatus utilizing the second harmonic generation. The constitution thereof is basically the same as that of the light generating apparatus shown in FIG. 9. Hereinafter, this light generating apparatus is explained based on FIG. 9.

The light generating apparatus 900 comprises a light source 901, the wavelength conversion element 902, and a control unit 903.

The light source 901 emits the first light (the fundamental wave) having the first wavelength $\lambda_1$. In the present invention, the polarization of the first light may be either a TM mode or a TE mode. The light source 901 can be a tunable semiconductor laser (a variable wavelength laser) emitting the coherent first light.

The wavelength conversion element 902 is any one of the wavelength conversion elements 500, 1400, 1410 and 1500 explained in the Embodiment 2, or a variation example thereof. The wavelength conversion element 902 converts the first light received from the light source 901 into the second light (the second harmonic) with the second wavelength $\lambda_2$. At that time, each of the plural cylindrical ferroelectric single crystals in the wavelength conversion element 902 has a domain inversion structure with a predetermined period enabling quasi-phase-matching in the direction perpendicular to the polarization direction thereof so that the first wavelength $\lambda_1$ and the second wavelength $\lambda_2$ satisfy the relation $\lambda_1=2\times\lambda_2$. When MgSLT is used for the cylindrical ferroelectric single crystal, the polarization reversal periods of the cylindrical ferroelectric single crystals are selected within the range from 1 µm to 10 µm. The cylindrical ferroelectric single crystal is not limited to MgSLT.

The control unit 903 controls the position of the wavelength conversion element 902. Particularly, the control unit 903 may obtain the information the first light possesses (e.g., wavelength, polarization) from the light source 901, and control the position of the wavelength conversion element 902 based on the obtained information. In this description, "to control the position of the wavelength conversion element 902" means that the control unit 903 controls the arrangement angle of each of the plural cylindrical ferroelectric single crystals of the wavelength conversion element 902 based on the information about polarization mode among the information the first light from the light source 901 possesses, so as to respond to the polarization mode of the first light, and/or that the control unit 903 controls the position of the wavelength conversion element 902 based on the wavelength among the information the first light from the light source 901 possesses, so that the first light emitted from the light source 901 irradiates the predetermined cylindrical ferroelectric single crystal in the wavelength conversion element 902. The control unit 903, for example, may store the data about the period dependence and the data about the temperature dependence of the second harmonic of the cylindrical ferroelectric single crystal, and may control the position of the wavelength conversion element 902, based on these data. The control unit 903 may control the light source 901 to set the first wavelength $\lambda_1$ of the output light from the light source 901, so that the user can obtain a light with a desired wavelength.

The light generating apparatus 900 may be equipped with reflecting mirrors (not shown) between the light source 901 and the wavelength conversion element 902, and on the light-emitting side of the wavelength conversion element 902, respectively and may be made to function as a resonator.

Next, the operation of the light generating apparatus 900 is explained:

For example, when the user wants to obtain the second light with a wavelength, $\lambda_2=0.39$ µm, the control unit 903 controls the light source 901 to emit the first light having the first wavelength, $\lambda_1=0.78$ µm. Then, the control unit 903 controls the position of the wavelength conversion element 902, based on the information the first light possesses (e.g., wavelength, polarization) and the like. In this case, the control unit 903 controls the position of the wavelength conversion element 902, so that the first light is incident on the cylindrical ferroelectric single crystal having the polarization reversal period of 3 µm. The first light incident on the predetermined cylindrical ferroelectric single crystal in the wavelength conversion element 902 is converted into the second light (a second harmonic) with the wavelength $\lambda_2=0.39$ µm, satisfying the above relation.

The light generating apparatus 900 according to Embodiment 4 comprises the wavelength conversion element 902 having multi-gratings formed by combining the cylindrical ferroelectric single crystals each of which has a domain inversion structure with a predetermined period. Thereby, the apparatus can generate the second harmonic always phase-matched to the tunable light source 901 emitting the fundamental wave (i.e., a tunability of the light source 901 can be easily achieved.)

As explained in Embodiment 1, since a cross-section parallel to the polarization direction of the cylindrical ferroelectric single crystal is virtually completely round, the thermal distribution should necessarily be centrosymmetric, even when a thermal distribution is caused in the cylindrical ferroelectric single crystal by the light incident on the wavelength conversion element 902. As a result, a high extinction ratio (i.e., a high linearity of polarization) of light can be maintained and the shape of the output light from the wavelength conversion element 902 (the second light) can be maintained to be circular. Moreover, the wavelength conversion element 902 has no dependence on the polarization direction of the incident light. Accordingly, the degree of freedom of the light source of the incident light is increased and the whole size of the optical system can be made compact.

As the wavelength conversion element 902 of the light generating apparatus 900 according to the present invention is constructed by combining the cylindrical ferroelectric single crystals, only the broken cylindrical ferroelectric single crystal in the manufacturing process has to be discarded, and the yield thereof is improved. Moreover, on the time of use thereof, only the broken cylindrical ferroelectric single crystal has to be exchanged, so that the cost of the users may be reduced. Because the wavelength conversion element 902 of the light generating apparatus 900 according to the present invention is constructed by arbitrarily combining the cylindrical ferroelectric single crystals, adjustments according to user's needs may be possible.

Embodiment 5 of the Invention According to the Second Means of the Present Invention The invention according to the second means of the present invention further includes as an embodiment, an invention related to a light generating apparatus utilizing the difference frequency generation. The constitution thereof is basically the same as that of the light generating apparatus shown in FIG. 10. Hereinafter, this light generating apparatus is explained based on FIG. 10.

The light generating apparatus 1000 comprises a light source 1001, an optical connecting system 1002, a wavelength conversion element 1003, and a control unit 1004.

The light source 1001 emits the first light (the pump light) having the wavelength $\lambda_1$. In the present invention, the polarization of the first-light may be either a TM mode or a TE mode. The light source 1001 can be a semiconductor laser with the first wavelength $\lambda_1=0.78$ µm, for example. A tunable light source may be used as the light source 1001.

The optical connecting system 1002 is an arbitrary optical system for connecting the first light from the light source 1001 and the second light (the signal light) having the second wavelength of $\lambda_2$. The second light is, for example, a light in C band (1.53 µm-1.57 µm) that is a typical communication band for wavelength division multiplexing (WDM). The first wavelength $\lambda_1$ and the second wavelength $\lambda_2$ satisfy the relation $\lambda_1<\lambda_2$.

The wavelength conversion element 1003 is any one of the wavelength conversion elements 500, 1400, 1410 and 1500 already explained for the Embodiment 2, or a variation example thereof. The wavelength conversion element 1003 converts the first light and the second light connected in the optical connecting system 1002, into the third light (the output light) having the third wavelength $\lambda_3$. At this time, each of the plural cylindrical ferroelectric single crystals in the wavelength conversion element 1003 has a domain inversion structure with a predetermined period enabling quasi-phase-matching in the direction perpendicular to the polarization direction, so that the first wavelength $\lambda_1$, the second wavelength $\lambda_2$ and the third wavelength $\lambda_3$ satisfy the relation $1/\lambda_1 - 1/\lambda_2 = 1/\lambda_3$. The cylindrical ferroelectric single crystal is not limited to MgSLT.

The control unit 1004 controls the position of the wavelength conversion element 1003.

Particularly, the control unit 1004 may obtain the information the first light from the light source 1001 possesses (e.g., wavelength, polarization) and the information the second light possesses (e.g., wavelength, polarization) and control the position of the wavelength conversion element 1003 based on the obtained information. In this description, "to control the position of the wavelength conversion element 1003" means that the control unit 1003 controls the arrangement angle of each of the plural cylindrical ferroelectric single crystals of the wavelength conversion element 1003 so as to respond to the polarization mode of the first light and the polarization of the second light based on the polarization among the information the first light from the light source 1001 possesses and on the polarization among the information the second light possesses, and/or that the control unit 1004 controls the position of the wavelength conversion element 1003 based on the wavelengths among the information the first light from the light source 1001 possesses and on the wavelengths among the information the second light possesses, so that the first light and the second light connected in the optical connecting system 1002 irradiate the predetermined cylindrical ferroelectric single crystal in the wavelength conversion element 1003. The control unit 1004, for example, may store the data about the period dependences and the data about the temperature dependences of the signal light and the output light of the cylindrical ferroelectric single crystal, and may control the position of the wavelength conversion element 1003 based on these data.

The light generating apparatus 1000 may be equipped with reflecting mirrors (not shown) between the optical connecting system 1002 and the wavelength conversion element 1003, and on the light-emitting side of the wavelength conversion element 1003, respectively, and may be made to function as a resonator.

Next, the operation of the light generating apparatus 1000 is explained.

For example, when the user wants to convert the second light (C band) with a wavelength $\lambda_2 = 1.55$ μm into the third light with a wavelength in L band using the first wavelength $\lambda_1 = 0.78$ μm, the control unit 1004 controls the position of the wavelength conversion element 1003, based on the information the first light possesses (wavelength, polarization) and the information the second light possesses (wavelength, polarization) and the like. In this case, the control unit 1004 controls the position of the wavelength conversion element 1003 so that the first light and the second light connected in the optical connecting system 1002 is incident on the cylindrical ferroelectric single crystal having the polarization reversal period of, for example, 17 μm. The first light and the second light incident on the predetermined cylindrical ferroelectric single crystal in the wavelength conversion element 1003 are converted into the third light with the wavelength, $\lambda_3 = 1.57$ μm, satisfying the above relation. Thus converted third wavelength $\lambda_3$ is in L band (1.57 μm-1.62 μm), a typical communication band for wavelength division multiplexing (WDM).

The light generating apparatus 1000 according to Embodiment 5 comprises the wavelength conversion element 1003 having multi-gratings formed by combining the cylindrical ferroelectric single crystals with the predetermined periods. Thereby, if the light source 1001 is a tunable light source, the apparatus can tunably adjust the fixed C band wavelength (the second wavelength $\lambda_2$ of the second light) into the L band wavelength (the third wavelength $\lambda_3$). Also, when the light source 1001 emits a single wavelength light, the wavelength in L band (the third wavelength $\lambda_3$) can be tunably adjusted, if the wavelength in C band (the second wavelength $\lambda_2$ of the second light) is variable. Thus, C-L band-conversion can be conducted in a tunable way. As explained in Embodiment 1, since the cross-section of the cylindrical ferroelectric single crystal in the same direction as the polarization direction is virtually completely round, the thermal distribution should necessarily be centrosymmetric, even when a thermal distribution is caused in the cylindrical ferroelectric single crystal by the light incident on the wavelength conversion element 1003. So that, a high extinction ratio (i.e., a high linearity of polarization) of the light can be maintained and the shape of the output light from the wavelength conversion element 1003 (the third light) can be maintained to be circular. Moreover, the wavelength conversion element 1003 has no dependence on the polarization direction of the incident light. Accordingly, the degree of freedom of the light source of the incident light is increased and the whole size of the optical system can be made compact.

As the wavelength conversion element 1003 of the light generating apparatus 1000 according to the present invention is formed by combining the cylindrical ferroelectric single crystals, only the broken cylindrical ferroelectric single crystal in the manufacturing process has to be discarded, and the yield thereof is improved. Moreover, on the time of use thereof, only the broken cylindrical ferroelectric single crystal has to be exchanged, so that the cost of the users may be reduced. Because the wavelength conversion element 1003 of the light generating apparatus 1000 according to the present invention is formed by arbitrarily combining the cylindrical ferroelectric single crystals, adjustments according to user's needs may be possible.

Difference frequency generation using the light generating apparatus 1000 shown in FIG. 10 has been explained above, but it should be noticed that sum-frequency generation using the light generating apparatus 1000 is also possible. In this case, each of the plural cylindrical ferroelectric single crystals in the wavelength conversion element 1003 may have a domain inversion structure with a predetermined period enabling quasi-phase-matching in the direction perpendicular to the polarization direction thereof so that the first wavelength $\lambda_1$, the second wavelength $\lambda_2$ and the third wavelength $\lambda_3$ satisfy the relation $1/\lambda_1 + 1/\lambda_2 = 1/\lambda_3$.

INDUSTRIAL APPLICABILITY OF THE INVENTION

The wavelength conversion element of the present invention comprises a holder and plural prismatic ferroelectric single crystals disposed in the holder. The plural prismatic ferroelectric single crystals have at least five planes and the aspect ratio of each plane perpendicular to the longitudinal direction thereof is virtually unity. Thereby, the element can respond to the polarization of the incident light, by only changing the arrangement of prismatic ferroelectric single crystals. Accordingly, optical systems such as polarizers are not necessary and the whole system can be made compact.

Each of plural prismatic ferroelectric single crystals has a domain inversion structure with a predetermined period in a direction perpendicular to the polarization direction thereof, and is disposed in a way that the direction perpendicular to the polarization direction of each crystal is the same as those of the other crystals. Thereby, only the prismatic ferroelectric single crystals failed to be constructed into domain inversion structure may be discarded, so that manufacturing yield of the wavelength conversion elements can be improved. If a crack is generated in one of the prismatic ferroelectric single crystals in the wavelength conversion element, the crack is not propagated to neighboring prismatic ferroelectric single crystals. Thus, it is enough to exchange only the broken prismatic ferroelectric single crystals, so that the cost can be reduced. Also, the desired combinations can be achieved, dependent on user's needs.

The wavelength conversion element of the present invention can easily achieve the tunability of the converted wavelength by combining the cylindrical ferroelectric single crystals, each having a domain inversion structure with a predetermined period, to form the wavelength conversion element having multi-gratings. These wavelength conversion elements can be utilized for the chemical analyses, the communications and the like.

The invention claimed is:

1. A wavelength conversion element comprising:
   a holder; and
   plural prismatic ferroelectric single crystals disposed in said holder,
   wherein,
   said plural prismatic ferroelectric single crystals have at least five planes;
   aspect ratios of planes perpendicular to respective longitudinal directions of said plural prismatic ferroelectric single crystals are virtually unity;
   each of said plural prismatic ferroelectric single crystals has a domain inversion structure with a predetermined period in a direction perpendicular to the polarization direction thereof; and
   said plural prismatic ferroelectric single crystals are disposed in a way that said direction perpendicular to the polarization direction of each crystal is the same as those of other crystals.

2. The wavelength conversion element according to claim 1, wherein, when each of said plural prismatic ferroelectric single crystals converts a first light having a wavelength $\lambda_1$ into a second light having a wavelength $\lambda_2$ and a third light having a wavelength $\lambda_3$, said predetermined period is a period that enables quasi-phase-matching of the lights, so that said wavelength $\lambda_1$, said wavelength $\lambda_2$ and said wavelength $\lambda_3$ satisfy the relation $1/\lambda_1=1/\lambda_2+1/\lambda_3$, and the relations $\lambda_1<\lambda_2$ and $\lambda_1<\lambda_3$.

3. The wavelength conversion element according to claim 1, wherein, when each of said plural prismatic ferroelectric single crystals converts a first light having a wavelength $\lambda_1$ into a second light having a wavelength $\lambda_2$, said predetermined period is a period that enables quasi-phase-matching of the lights, so that said first wavelength $\lambda_1$ and said second wavelength $\lambda_2$ satisfy the relation $\lambda_1=2\times\lambda_2$.

4. The wavelength conversion element according to claim 1, wherein, when each of said plural prismatic ferroelectric single crystals converts a first light having a wavelength $\lambda_1$ and a second light having a wavelength $\lambda_2$ into a third light having a wavelength $\lambda_3$, said predetermined period is the period that enables quasi-phase-matching of the lights, so that said first wavelength $\lambda_1$, said second wavelength $\lambda_2$ and said wavelength $\lambda_3$ satisfy the relation $1/\lambda_1\pm1/\lambda_2=1/\lambda_3$.

5. The wavelength conversion element according to claim 1, wherein each of said plural prismatic ferroelectric single crystals has six planes.

6. The wavelength conversion element according to claim 1, wherein each of said plural prismatic ferroelectric single crystals is selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

7. The wavelength conversion element according to claim 1, wherein said holder is made of heat-conductive material.

8. The wavelength conversion element according to claim 1, further comprising
   a temperature control element disposed in said holder; and
   a heat-insulating frame surrounding said holder and said temperature control element.

9. The wavelength conversion element according to claim 8, further comprising a control unit for controlling said temperature control element.

10. The wavelength conversion element according to claim 1, wherein said plural prismatic ferroelectric single crystals are disposed with spaces having predetermined width and said spaces are filled with heat-conductive material.

11. A light generating apparatus comprising:
    a light source for emitting a first light having a first wavelength $\lambda_1$;
    a wavelength conversion element for converting said first light into a second light having a second wavelength $\lambda_2$ and a third light having a third wavelength $\lambda_3$; and
    a control unit for controlling the position of said wavelength conversion element,
    wherein, said wavelength conversion element comprises a holder and plural prismatic ferroelectric single crystals disposed in said holder; said plural prismatic ferroelectric single crystals have at least five planes; aspect ratios of planes perpendicular to respective longitudinal directions of said plural prismatic ferroelectric single crystals are virtually unity; each of said plural prismatic ferroelectric single crystals has a domain inversion structure with a predetermined period enabling quasi-phase-matching in the direction perpendicular to the polarization direction thereof so that the first wavelength $\lambda_1$, the second wavelength $\lambda_2$, and the third wavelength $\lambda_3$ satisfy the relation $1/\lambda_1=1/\lambda_2+1/\lambda_3$ and the relations $\lambda_1<\lambda_2$ and $\lambda_1<\lambda_3$; and, said plural prismatic ferroelectric single crystals are disposed in a way that said direction perpendicular to the polarization direction of each crystal is the same as those of the other crystals.

12. The light generating apparatus according to claim 11, wherein each of said plural prismatic ferroelectric single crystals has six planes.

13. The light generating apparatus according to claim 11, wherein each of said plural prismatic ferroelectric single crystals is selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

14. The light generating apparatus according to claim 11, wherein said holder is made of heat-conductive material.

15. The light generating apparatus according to claim 11, wherein said wavelength conversion element further comprises:
    a temperature control element disposed in said holder; and
    a heat-insulating frame surrounding said holder and said temperature control element.

16. The light generating apparatus according to claim 15, wherein said control unit further controls the temperature of said temperature control element.

17. The light generating apparatus according to claim 11, wherein said plural prismatic ferroelectric single crystals are disposed with spaces having predetermined width and said spaces are filled with heat-conductive material.

18. A light generating apparatus comprising:
a light source for emitting a first light having a first wavelength $\lambda_1$;
a wavelength conversion element for converting said first light into a second light having a second wavelength $\lambda_2$; and
a control unit for controlling the position of said wavelength conversion element,
wherein, said wavelength conversion element comprises a holder and plural prismatic ferroelectric single crystals disposed in said holder; said plural prismatic ferroelectric single crystals have at least five planes; aspect ratios of planes perpendicular to respective longitudinal directions of said plural prismatic ferroelectric single crystals are virtually unity; each of said plural prismatic ferroelectric single crystals has a domain inversion structure with a predetermined period enabling quasi-phase-matching in the direction perpendicular to the polarization direction thereof so that the first wavelength $\lambda_1$ and the second wavelength $\lambda_2$ satisfy the relation $\lambda_1=2\times\lambda_2$; and, said plural prismatic ferroelectric single crystals are disposed in a way that said direction perpendicular to the polarization direction of each crystal is the same as those of the other crystals.

19. The light generating apparatus according to claim 18, wherein each of said plural prismatic ferroelectric single crystals has six planes.

20. The light generating apparatus according to claim 18, wherein each of said plural prismatic ferroelectric single crystals is selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

21. The light generating apparatus according to claim 18, wherein said holder is made of heat-conductive material.

22. The light generating apparatus according to claim 18, wherein said wavelength conversion element further comprises:
a temperature control element disposed in said holder; and
a heat-insulating frame surrounding said holder and said temperature control element.

23. The light generating apparatus according to claim 22, wherein said control unit further controls the temperature of said temperature control element.

24. The light generating apparatus according to claim 18, wherein said plural prismatic ferroelectric single crystals are disposed with spaces having predetermined width and said spaces are filled with heat-conductive material.

25. A light generating apparatus comprising:
a first light source for emitting a first light having a first wavelength $\lambda_1$;
an optical system for connecting said first light and a second light having a second wavelength $\lambda_2$ incident from outside;
a wavelength conversion element for converting said first light and said second light into a third light having a third wavelength $\lambda_3$; and
a control unit for controlling the position of said wavelength conversion element,
wherein, said wavelength conversion element comprises a holder and plural prismatic ferroelectric single crystals disposed in said holder; said plural prismatic ferroelectric single crystals have at least five planes; aspect ratios of planes perpendicular to respective longitudinal directions of said plural prismatic ferroelectric single crystals are virtually unity; each of said plural prismatic ferroelectric single crystals has a domain inversion structure with a predetermined period enabling quasi-phase-matching in the direction perpendicular to the polarization direction thereof so that the first wavelength $\lambda_1$, the second wavelength $\lambda_2$ and the third wavelength $\lambda_3$ satisfy the relation $1/\lambda_1 \pm 1/\lambda_2 = 1/\lambda_3$; and said plural prismatic ferroelectric single crystals are disposed in a way that said direction perpendicular to the polarization direction of each crystal is the same as those of the other crystals.

26. The light generating apparatus according to claim 25, wherein each of said plural prismatic ferroelectric single crystals has six planes.

27. The light generating apparatus according to claim 25, wherein each of said plural prismatic ferroelectric single crystals is selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

28. The light generating apparatus according to claim 25, wherein said holder is made of heat-conductive material.

29. The light generating apparatus according to claim 25, wherein said wavelength conversion element further comprises:
a temperature control element disposed in said holder; and
a heat-insulating frame surrounding said holder and said temperature control element.

30. The light generating apparatus according to claim 29, wherein said control unit further controls the temperature of said temperature control element.

31. The light generating apparatus according to claim 25, wherein said plural prismatic ferroelectric single crystals are disposed with spaces having predetermined width and said spaces are filled with heat-conductive material.

32. A wavelength conversion element comprising:
a holder; and
plural cylindrical ferroelectric single crystals disposed in said holder,
wherein, respective cross-sections of said plural cylindrical ferroelectric single crystals are virtually completely round; each of said plural cylindrical ferroelectric single crystals has a domain inversion structure with a predetermined period in a direction perpendicular to said polarization direction; and said plural cylindrical ferroelectric single crystals are disposed in a way that said direction perpendicular to the polarization direction of each crystal is the same as those of the other crystals.

33. The wavelength conversion element according to claim 32, wherein said plural cylindrical ferroelectric single crystals are selected respectively from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

34. The wavelength conversion element according to claim 32, wherein, when each of said plural cylindrical ferroelectric single crystals converts a first light having a first wavelength $\lambda_1$ into a second light having a second wavelength $\lambda_2$ and a third light having a third wavelength $\lambda_3$, said predetermined period is the period that enables quasi-phase-matching of the lights, so said first wavelength $\lambda_1$, said second wavelength $\lambda_2$ and said third wavelength $\lambda_3$ satisfy the relation $1/\lambda_1 = 1/\lambda_2 + 1/\lambda_3$, and the relations $\lambda_1 < \lambda_2$ and $\lambda_1 < \lambda_3$.

35. The wavelength conversion element according to claim 32, wherein, when each of said plural cylindrical ferroelectric single crystals converts a first light having a first wavelength $\lambda_1$ into a second light having a second wavelength $\lambda_2$, said predetermined period is the period that enables quasi-phase-matching of the lights, so that said first wavelength $\lambda_1$ and said second wavelength $\lambda_2$ satisfy the relation $\lambda_1=2\times\lambda_2$.

36. The wavelength conversion element according to claim 32, wherein, when each of said plural cylindrical ferroelectric single crystals converts a first light having a first wavelength $\lambda_1$ and a second light having a second wavelength $\lambda_2$ into a third light having a third wavelength $\lambda_3$, said predetermined period is the period that enables quasi-phase-matching of the lights, so that said first wavelength $\lambda_1$, said second wavelength $\lambda_2$ and said third wavelength $\lambda_3$ satisfy the relation $1/\lambda_1\pm1/\lambda_2=1/\lambda_3$.

37. The wavelength conversion element according to claim 32, wherein said holder is made of heat-conductive material.

38. The wavelength conversion element according to claim 32, further comprising:
a temperature control element disposed in said holder; and
a heat-insulating frame surrounding said holder and said temperature control element.

39. The wavelength conversion element according to claim 38, further comprising a control unit for controlling said temperature control element.

40. The wavelength conversion element according to claim 32, wherein said plural cylindrical ferroelectric single crystals are disposed with spaces having predetermined width and said spaces are filled with heat-conductive material.

41. A light generating apparatus comprising:
a light source for emitting a first light having a first wavelength $\lambda_1$;
a wavelength conversion element for converting said first light into a second light having a second wavelength $\lambda_2$ and a third light having a third wavelength $\lambda_3$; and
a control unit for controlling the position of said wavelength conversion element,
wherein, said wavelength conversion element comprises a holder and plural cylindrical ferroelectric single crystals disposed in said holder; respective cross-sections of said plural cylindrical ferroelectric single crystals are virtually completely round; each of said plural cylindrical ferroelectric single crystals has a domain inversion structure with a predetermined period enabling quasi-phase-matching of lights in the direction perpendicular to said polarization direction so that the first wavelength $\lambda_1$, the second wavelength $\lambda_2$ and the third wavelength $\lambda_3$ satisfy the relation $1/\lambda_1=1/\lambda_2+1/\lambda_3$ and the relations $\lambda_1<\lambda_2$ and $\lambda_1<\lambda_3$; and said plural cylindrical ferroelectric single crystals are disposed in a way that said direction perpendicular to the polarization direction of each crystal is the same as those of the other crystals.

42. The light generating apparatus according to claim 41, wherein said plural cylindrical ferroelectric single crystals are selected respectively from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

43. The light generating apparatus according to claim 41, wherein said holder is made of heat-conductive material.

44. The light generating apparatus according to claim 41, wherein said wavelength conversion element further comprises:
a temperature control element disposed in said holder; and
a heat-insulating frame surrounding said holder and said temperature control element.

45. The light generating apparatus according to claim 44, wherein said control unit further controls the temperature of said temperature control element.

46. The light generating apparatus according to claim 41, wherein said plural cylindrical ferroelectric single crystals are disposed with spaces having predetermined width and said spaces are filled with heat-conductive material.

47. A light generating apparatus comprising:
a light source for emitting a first light having a first wavelength $\lambda_1$;
a wavelength conversion element for converting said first light into a second light having a second wavelength $\lambda_2$; and
a control unit for controlling the position of said wavelength conversion element,
wherein, said wavelength conversion element comprises a holder and plural cylindrical ferroelectric single crystals disposed in said holder; respective cross-sections of said plural cylindrical ferroelectric single crystals are virtually completely round; each of said plural cylindrical ferroelectric single crystals has a domain inversion structure with a predetermined period enabling quasi-phase-matching of the lights in the direction perpendicular to said polarization direction so that the first wavelength $\lambda_1$ and the second wavelength $\lambda_2$ satisfy the relation $\lambda_1=2\times\lambda_2$; and said plural cylindrical ferroelectric single crystals are disposed in a way that said direction perpendicular to the polarization direction of each crystal is the same as those of the other crystals.

48. The light generating apparatus according to claim 47, wherein each of said plural cylindrical ferroelectric single crystals is selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

49. The light generating apparatus according to claim 47, wherein said holder is made of heat-conductive material.

50. The light generating apparatus according to claim 47, wherein said wavelength conversion element further comprises:
a temperature control element disposed in said holder; and
a heat-insulating frame surrounding said holder and said temperature control element.

51. The light generating apparatus according to claim 50, wherein said control unit further controls the temperature of said temperature control element.

52. The light generating apparatus according to claim 47, wherein said plural cylindrical ferroelectric single crystals are disposed with spaces having predetermined width and said spaces are filled with heat-conductive material.

53. A light generating apparatus comprising:
a first light source for emitting a first light having a first wavelength $\lambda_1$;
an optical system for connecting said first light and a second light having a second wavelength $\lambda_2$ incident from outside;
a wavelength conversion element for converting said first light and said second light into a third light having a third wavelength $\lambda_3$; and
a control unit for controlling the position of said wavelength conversion element,
wherein, said wavelength conversion element comprises a holder and plural cylindrical ferroelectric single crystals disposed in said holder, and each cross-section of said plural cylindrical ferroelectric single crystals is virtually completely round; each of said plural cylindrical ferroelectric single crystals has a domain inversion structure with a predetermined period enabling quasi-phase-matching in the direction perpendicular to said polarization direction so that the first wavelength $\lambda_1$, the second wavelength $\lambda_2$ and the third wavelength $\lambda_3$ satisfy the relation $1/\lambda_1 \pm 1/\lambda_2 = 1/\lambda_3$; and said plural cylindrical ferroelectric single crystals are disposed in a way that said direction perpendicular to the polarization direction of each crystal is the same as those of the other crystals.

54. The light generating apparatus according to claim 53, wherein each of said plural cylindrical ferroelectric single crystals is selected from a group comprising lithium niobate with substantially stoichiometric composition, lithium tantalate with substantially stoichiometric composition, impurity-doped lithium niobate with substantially stoichiometric composition, and impurity-doped lithium tantalate with substantially stoichiometric composition.

55. The light generating apparatus according to claim 53, wherein said holder is made of heat-conductive material.

56. The light generating apparatus according to claim 53, wherein said wavelength conversion element further comprises:
 a temperature control element disposed in said holder; and
 a heat-insulating frame surrounding said holder and said temperature control element.

57. The light generating apparatus according to claim 56, wherein said control unit further controls the temperature of said temperature control element.

58. The light generating apparatus according to claim 53, wherein said plural cylindrical ferroelectric single crystals are disposed with spaces with predetermined width and said spaces are filled with heat-conductive material.

* * * * *